(12) United States Patent
Loehr et al.

(10) Patent No.: US 10,271,347 B2
(45) Date of Patent: Apr. 23, 2019

(54) SCHEDULING REQUEST PROCEDURE

(71) Applicant: Panasonic Intellectual Property Corporation of America, Torrance, CA (US)

(72) Inventors: Joachim Loehr, Hessen (DE); Prateek Basu Mallick, Hessen (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/545,267

(22) PCT Filed: Dec. 22, 2015

(86) PCT No.: PCT/EP2015/081049
§ 371 (c)(1),
(2) Date: Jul. 20, 2017

(87) PCT Pub. No.: WO2016/119981
PCT Pub. Date: Aug. 4, 2016

(65) Prior Publication Data
US 2018/0014322 A1    Jan. 11, 2018

(30) Foreign Application Priority Data
Jan. 26, 2015 (EP) .................................. 15152520.1

(51) Int. Cl.
*H04W 72/12*        (2009.01)
*H04W 76/28*        (2018.01)
(Continued)

(52) U.S. Cl.
CPC ... *H04W 72/1284* (2013.01); *H04W 28/0278* (2013.01); *H04W 52/0206* (2013.01);
(Continued)

(58) Field of Classification Search
CPC .......................................................... H04L 12/28
(Continued)

(56) References Cited

U.S. PATENT DOCUMENTS 9,161,306 B2 * 10/2015 Chun .................... H04W 6/048
2012/0233481 A1    9/2012 Henttonen et al.
(Continued)

FOREIGN PATENT DOCUMENTS

WO    2011/038775 A1    4/2011

OTHER PUBLICATIONS

3GPP TS 36.211 V8.9.0, $3^{rd}$ Generation Partnership Project; Technical Specification Group Radio Access Network; Evolved Universal Terrestrial Radio Access (E-UTRA); Physical Channels and Modulation (Release 8), Dec. 2009, 83 pages.
(Continued)

*Primary Examiner* — Dang T Ton
(74) *Attorney, Agent, or Firm* — Seed IP Law Group LLP

(57) ABSTRACT

The invention relates to a method for requesting uplink resources by a user equipment in a communication system, wherein a DRX, Discontinued Reception, function is running at the user equipment. The transmission of a scheduling request for requesting uplink resources to a radio base station is triggered upon triggering of a buffer status report in the user equipment. However, the triggering of the scheduling request is delayed such that the scheduling request is triggered in one of the subframes—preferably the first subframe—of an On-Duration period of a DRX cycle according to the DRX function. Correspondingly, the triggered scheduling request is transmitted to the radio base station in the next possible scheduling request transmission occasion after the triggering of the scheduling request is delayed.

15 Claims, 11 Drawing Sheets

(51) Int. Cl.
*H04W 52/02* (2009.01)
*H04W 28/02* (2009.01)
*H04W 88/02* (2009.01)
*H04W 88/08* (2009.01)

(52) U.S. Cl.
CPC ....... *H04W 52/0251* (2013.01); *H04W 76/28* (2018.02); *H04W 88/02* (2013.01); *H04W 88/08* (2013.01); *Y02D 70/00* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/21* (2018.01); *Y02D 70/23* (2018.01); *Y02D 70/24* (2018.01)

(58) Field of Classification Search
USPC .......................................... 370/403
See application file for complete search history.

(56) References Cited

U.S. PATENT DOCUMENTS

2013/0021995 A1  1/2013  Ehsan et al.
2015/0009815 A1  1/2015  Hsu et al.

OTHER PUBLICATIONS

3GPP TS 36.212 V12.3.0, 3rd Generation Partnership Project; Technical Specification Group Radio Access Network; Evolved Universal Terrestrial Radio Access (E-UTRA); Multiplexing and channel coding (Release 12); Dec. 2014, 89 pages.
3GPP TS 36.213 V12.4.0, 3rd Generation Partnership Project; Technical Specification Group Radio Access Network; Evolved Universal Terrestrial Radio Access (E-UTRA); Physical layer procedures (Release 12), Dec. 2014, 225 pages.
3GPP TS 36.321 V12.4.0, "3rd Generation Partnership Project; Technical Specification Group Radio Access Network; Evolved Universal Terrestrial Group Radio Access (E-UTRA); Medium Access Control (MAC) protocol specification (Release 12)," Dec. 2014, 60 pages.
3GPP TS 36.331 V12.4.1, "3rd Generation Partnership Project; Technical Specification Group Radio Access Network; Evolved Universal Terrestrial Group Radio Access (E-UTRA); Radio Resource Control (RRC); Protocol Specification (Release 12)," Dec. 2014, 410 pages.
Extended European Search Report, dated Jul. 16, 2015, for corresponding European Application No. 15152520.1-1505, 6 pages.
International Search Report dated Mar. 16, 2016, for corresponding International Application No. PCT/EP2015/081049, 3 pages.
Sesia et al., "LTE the UMTS Long Term Evolution—From Theory to Practice," Wiley, 2009, Chapter 9.3, 21 pages.

* cited by examiner

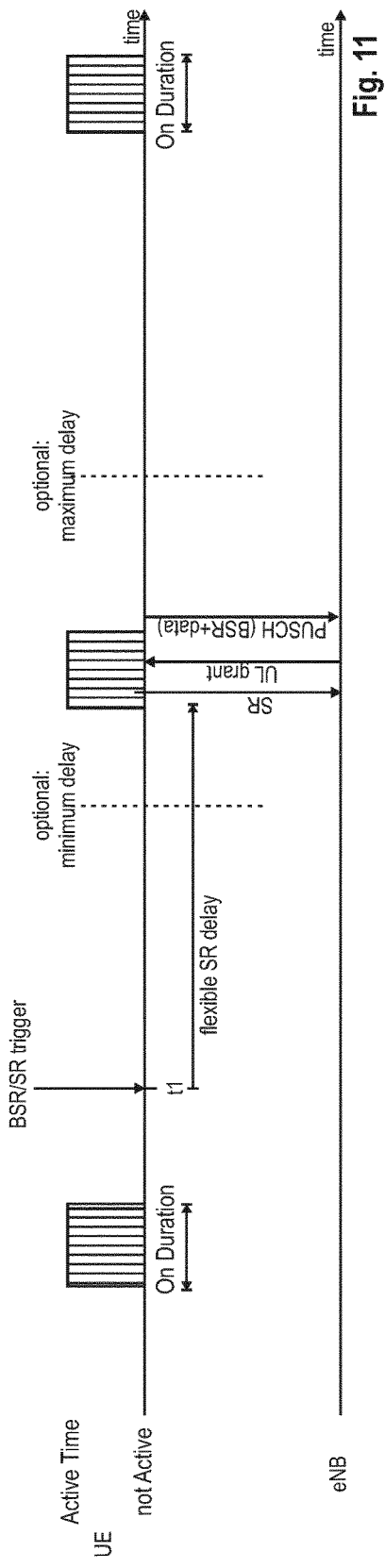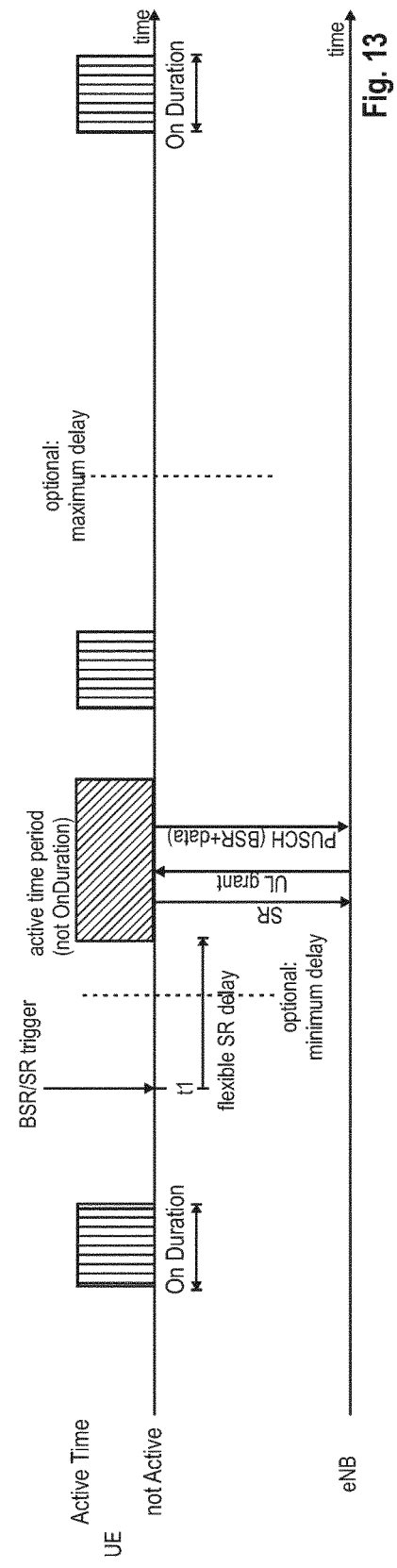

SCHEDULING REQUEST PROCEDURE

BACKGROUND

Technical Field

The present disclosure relates to methods for requesting uplink resources by a user equipment in a communication system. The present disclosure is also providing the user equipment for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, High Speed Uplink Packet Access (HSUPA), giving a radio access technology that is highly competitive.

In order to be prepared for further increasing user demands and to be competitive against new radio access technologies, 3GPP introduced a new mobile communication system, which is called Long Term Evolution (LTE). LTE is designed to meet the carrier needs for high speed data and media transport, as well as high capacity voice support, for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Release 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed, including multiple-input multiple-output (MIMO) channel transmission techniques, and a highly efficient control signaling structure is achieved in LTE Release 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically, to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for generation and allocation of temporary identities to user equipments. It checks the authorization of the user equipment to camp on the service provider's Public Land Mobile Network (PLMN), and enforces user equipment roaming restrictions. The MME is the termination point in the network for ciphering/integrity protection for NAS signaling, and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain into so-called subframes. In 3GPP LTE, each subframe is divided into two downlink slots as shown in FIG. 3, wherein the first downlink slot comprises the control channel region (PDCCH region) within the first OFDM symbols. Each subframe consists of a given number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers, as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g., 7 OFDM symbols) and $N_{sc}^{RB}$ consecutive subcarriers in the frequency domain, as exemplified in FIG. 4 (e.g., 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see, for example, 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following, the time-frequency resources equivalent to the same $N_{sc}^{RB}$ consecutive subcarriers spanning a full subframe are called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure also apply to later releases.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz, even though these cells in LTE may be in different frequency bands.

All component carriers can be configured to be LTE Release 8/9 compatible, at least when the bandwidth of a component carrier does not exceed the supported bandwidth of an LTE Release 8/9 cell. Not all component carriers aggregated by a user equipment may necessarily be Release 8/9 compatible. Existing mechanism (e.g., barring) may be used to avoid Release 8/9 user equipments to camp on a component carrier.

A user equipment may simultaneously receive or transmit one or multiple component carriers (corresponding to multiple serving cells), depending on its capabilities. An LTE-A Release 10 user equipment with reception and/or transmission capabilities for carrier aggregation can simultaneously receive and/or transmit on multiple serving cells, whereas an LTE Release 8/9 user equipment can receive and transmit on a single serving cell only, provided that the structure of the component carrier follows the Release 8/9 specifications.

Carrier aggregation is supported for both contiguous and non-contiguous component carriers, with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI), similarly as in LTE Release 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC).

The characteristics of the downlink and uplink PCell are:
For each SCell, the usage of uplink resources by the UE in addition to the downlink resources is configurable (the number of DL SCCs configured is therefore always larger or equal to the number of UL SCCs, and no SCell can be configured for usage of uplink resources only);

The downlink PCell cannot be deactivated, unlike SCells;

Re-establishment is triggered when the downlink PCell experiences Rayleigh fading (RLF), not when downlink SCells experience RLF;

Non-access stratum information is taken from the downlink PCell;

PCell can only be changed with handover procedure (i.e., with security key change and RACH procedure);

PCell is used for transmission of PUCCH;

The uplink PCell is used for transmission of Layer 1 uplink control information; and From a UE viewpoint, each uplink resource only belongs to one serving cell.

The configuration and reconfiguration, as well as the addition and removal, of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Release 8/9 for handover).

When a user equipment is configured with carrier aggregation there is at least one pair of uplink and downlink component carriers that is always active. The downlink component carrier of that pair might be also referred to as 'DL anchor carrier'. The same applies also for the uplink.

When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking, established by RRC signaling, between uplink and downlink component carriers allows identifying the uplink component carrier for which the grant applies when there is no-cross-carrier scheduling. The linkage of downlink component carriers to uplink component carriers does not necessarily need to be one to one. In other words, more than one downlink component carrier can link to the same uplink component carrier. At the same time, a downlink component carrier can only link to one uplink component carrier.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size $BW_{grant}$ during one time interval, e.g., a subframe of 0.5 ms, onto which coded information bits are mapped. It should be noted that a subframe, also referred to as a transmission time interval (TTI), is the smallest time interval for user data transmission. It is, however, possible to assign a frequency resource BW grant over a longer time period than one TTI to a user by concatenation of subframes.

UL Scheduling Scheme for LTE

The uplink scheme allows for both scheduled access, i.e., controlled by eNB, and contention-based access.

In case of scheduled access, the UE is allocated a certain frequency resource for a certain time (i.e., a time/frequency resource) for uplink data transmission. However, some time/frequency resources can be allocated for contention-based access. Within these time/frequency resources, UEs can transmit without first being scheduled. One scenario where UE is making a contention-based access is, for example, the random access, i.e., when UE is performing initial access to a cell, or for requesting uplink resources.

For the scheduled access, Node B scheduler assigns a user a unique frequency/time resource for uplink data transmission. More specifically, the scheduler determines:

which UE(s) is (are) allowed to transmit;

which physical channel resources (frequency); and

Transport format (Modulation Coding Scheme (MCS)) to be used by the mobile terminal for transmission.

The allocation information is signaled to the UE via a scheduling grant, sent on the L1/L2 control channel. For simplicity reasons, this channel is called uplink grant channel in the following. A scheduling grant message contains information about which part of the frequency band the UE is allowed to use, the validity period of the grant, and the transport format the UE has to use for the upcoming uplink transmission. The shortest validity period is one subframe. Additional information may also be included in the grant message, depending on the selected scheme. Only "per UE" grants are used to grant the right to transmit on the UL-SCH (i.e., there are no "per UE per RB" grants). Therefore the UE needs to distribute the allocated resources among the radio bearers according to some rules. Unlike in HSUPA, there is no UE based transport format selection. The eNB decides the transport format based on some information, e.g., reported scheduling information and QoS info, and the UE has to follow the selected transport format. In HSUPA, the Node B assigns the maximum uplink resource, and the UE selects accordingly the actual transport format for the data transmissions.

Since the scheduling of radio resources is the most important function in a shared channel access network for determining Quality of Service, there are a number of requirements that should be fulfilled by the UL scheduling scheme for LTE in order to allow for an efficient QoS management:

Starvation of low priority services should be avoided;

Clear QoS differentiation for radio bearers/services should be supported by the scheduling scheme;

The UL reporting should allow fine granular buffer reports (e.g., per radio bearer or per radio bearer group) in order to allow the eNB scheduler to identify for which Radio Bearer/service data is to be sent;

It should be possible to make clear QoS differentiation between services of different users; and It should be possible to provide a minimum bit rate per radio bearer.

As can be seen from above list, one essential aspect of the LTE scheduling scheme is to provide mechanisms with which the operator can control the partitioning of its aggregated cell capacity between the radio bearers of the different QoS classes. The QoS class of a radio bearer is identified by the QoS profile of the corresponding SAE bearer signaled from AGW to eNB as described before. An operator can then allocate a certain amount of its aggregated cell capacity to the aggregated traffic associated with radio bearers of a certain QoS class. The main goal of employing this class-based approach is to be able to differentiate the treatment of packets depending on the QoS class they belong to.

Layer 1/Layer 2 (L1/L2) Control Signaling

In order to inform the scheduled users about their allocation status, transport format and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even be dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH. Furthermore, Release 11 introduced an EPDCCH that fulfills basically the same function as the PDCCH, i.e., conveys L1/L2 control signaling, even though the detailed transmission methods are different from the PDCCH. Further details can be found particularly in the current versions of 3GPP TS 36.211 and 36.213, incorporated herein by reference. Consequently, most items outlined in the background and the embodiments apply to PDCCH as well as EPDCCH, or other means of conveying L1/L2 control signals, unless specifically noted.

Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (Resource Blocks, RBs) on which a user is allocated. Alternatively this information is termed resource block assignment (RBA). Note that the number of RBs on which a user is allocated can be dynamic;

Carrier indicator, which is used if a control channel transmitted on a first carrier assigns resources that concern a second carrier, i.e., resources on a second carrier or resources related to a second carrier (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication of whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission, depending on the DCI format that is used.

Downlink control information occurs in several formats that differ in overall size and also in the information contained in their fields. The different DCI formats that are currently defined for LTE are as follows, and are described in detail in 3GPP TS 36.212, "Multiplexing and channel coding", section 5.3.3.1 (current version v12.3.0 available at http://www.3gpp.org and incorporated herein by reference). In addition, for further information regarding the DCI formats and the particular information that is transmitted in the DCI, please refer to the aforementioned technical standard or to "LTE—The UMTS Long Term Evolution—From Theory to Practice", Edited by Stefanie Sesia, Issam Toufik, Matthew Baker, Chapter 9.3, incorporated herein by reference.

Additional formats may be defined in the future.

DRX (Discontinuous Reception)

DRX functionality can be configured for RRC_IDLE, in which case the UE uses either the specific or default DRX value (defaultPagingCycle); the default is broadcasted in the System Information, and can have values of 32, 64, 128 and 256 radio frames. If both specific and default values are available, the shorter value of the two is chosen by the UE. The UE needs to wake up for one paging occasion per DRX cycle, the paging occasion being one subframe.

DRX functionality can be also configured for an "RRC_CONNECTED" UE, so that it does not always need to monitor the downlink channels. In order to provide reasonable battery consumption of user equipment, 3GPP LTE (Release 8/9) as well as 3GPP LTE-A (Release 10) provides a concept of discontinuous reception (DRX). Technical Standard TS 36.321 v12.4.0 Chapter 5.7 explains the DRX and is incorporated by reference herein.

The following parameters are available to define the DRX UE behavior; i.e., the On-Duration periods at which the mobile node is active, and the periods where the mobile node is in a DRX mode:

On-Duration: duration in downlink subframes that the user equipment, after waking up from DRX, receives and monitors the PDCCH. If the user equipment successfully decodes a PDCCH, the user equipment stays awake and starts the inactivity timer; [1-200 subframes; 16 steps: 1-6, 10-60, 80, 100, 200];

DRX inactivity timer: duration in downlink subframes that the user equipment waits to successfully decode a PDCCH, from the last successful decoding of a PDCCH; when the UE fails to decode a PDCCH during this period, it re-enters DRX. The user equipment shall restart the inactivity timer following a single successful decoding of a PDCCH for a first transmission only (i.e., not for retransmissions). [1-2560 subframes; 22 steps, 10 spares: 1-6, 8, 10-60, 80, 100-300, 500, 750, 1280, 1920, 2560];

DRX Retransmission timer: specifies the number of consecutive PDCCH subframes where a downlink retransmission is expected by the UE after the first available retransmission time. [1-33 subframes, 8 steps: 1, 2, 4, 6, 8, 16, 24, 33];

DRX short cycle: specifies the periodic repetition of the On-Duration followed by a possible period of inactivity for the short DRX cycle. This parameter is optional. [2-640 subframes; 16 steps: 2, 5, 8, 10, 16, 20, 32, 40, 64, 80, 128, 160, 256, 320, 512, 640];

DRX short cycle timer: specifies the number of consecutive subframes the UE follows the short DRX cycle after the DRX inactivity timer has expired. This parameter is optional. [1-16 subframes]; and Long DRX Cycle Start offset: specifies the periodic repetition of the On-Duration followed by a possible period of inactivity for the DRX long cycle as well as an offset in subframes when On-Duration starts (determined by formula defined in TS 36.321 section 5.7); [cycle length 10-2560 subframes; 16 steps: 10, 20, 30, 32, 40, 64, 80, 128, 160, 256, 320, 512, 640, 1024, 1280, 2048, 2560; offset is an integer between [0—subframe length of chosen cycle]].

The total duration that the UE is awake is called "Active Time". The Active Time includes the On-Duration of the DRX cycle, the time UE is performing continuous reception while the inactivity timer has not expired, and the time UE is performing continuous reception while waiting for a downlink retransmission after one HARQ RTT. Similarly, for the uplink the UE is awake at the subframes where uplink retransmission grants can be received, i.e., every 8ms after initial uplink transmission until maximum number of retransmissions is reached. Based on the above, the minimum Active Time is of fixed length equal to On-Duration, and the maximum is variable depending on, e.g., the PDCCH activity.

The "DRX period" is the duration of downlink subframes during which a UE can skip reception of downlink channels for battery saving purposes. The operation of DRX gives the mobile terminal the opportunity to deactivate the radio circuits repeatedly (according to the currently active DRX cycle) in order to save power. Whether the UE indeed remains in DRX (i.e., is not active) during the DRX period may be decided by the UE; for example, the UE usually performs inter-frequency measurements which cannot be conducted during the On-Duration, and thus need to be performed some other time, during the DRX opportunity of time.

The parameterization of the DRX cycle involves a trade-off between battery saving and latency. For example, in case of a web browsing service, it is usually a waste of resources for a UE to continuously receive downlink channels while the user is reading a downloaded web page. On the one hand, a long DRX period is beneficial for lengthening the UE's battery life. On the other hand, a short DRX period is better for faster response when data transfer is resumed—for example, when a user requests another web page.

To meet these conflicting requirements, two DRX cycles—a short cycle and a long cycle—can be configured for each UE; the short DRX cycle is optional, i.e., only the long DRX cycle is used. The transition between the short DRX cycle, the long DRX cycle, and continuous reception is controlled either by a timer or by explicit commands from the eNodeB. In some sense, the short DRX cycle can be considered as a confirmation period in case a late packet arrives, before the UE enters the long DRX cycle. If data arrives at the eNodeB while the UE is in the short DRX cycle, the data is scheduled for transmission at the next On-Duration time, and the UE then resumes continuous reception. On the other hand, if no data arrives at the eNodeB during the short DRX cycle, the UE enters the long DRX cycle, assuming that the packet activity is finished for the time being.

During the Active Time, the UE monitors PDCCH, reports SRS (Sounding Reference Signal) as configured and reports CQI (Channel Quality Information)/PMI (Precoding Matrix Indicator)/RI (Rank Indicator)/PTI (Precoder Type Indication) on PUCCH. When UE is not in Active Time, type-0-triggered SRS and CQI/PMI/RI/PTI on PUCCH may not be reported. If CQI masking is set up for the UE, the reporting of CQI/PMI/RI/PTI on PUCCH is limited to On-Duration.

Available DRX values are controlled by the network and start from non-DRX, going up to x seconds. Value x may be as long as the paging DRX used in RRC_IDLE. Measurement requirements and reporting criteria can differ according to the length of the DRX interval; i.e., long DRX intervals may have more relaxed requirements (for more details see further below). When DRX is configured, periodic CQI reports can only be sent by the UE during "Active Time". RRC can further restrict periodic CQI reports so that they are only sent during the On-Duration.

FIG. 8 discloses an example of DRX. The UE checks for scheduling messages (indicated by its C-RNTI, cell radio network temporary identity, on the PDCCH) during the "On-Duration" period, which is the same for the long DRX cycle and the short DRX cycle. When a scheduling message is received during an "On-Duration", the UE starts an "inactivity timer" and monitors the PDCCH in every subframe while the inactivity timer is running. During this period, the UE can be regarded as being in a continuous reception mode. Whenever a scheduling message is received while the inactivity timer is running, the UE restarts the inactivity timer, and when it expires the UE moves into a short DRX cycle and starts a "short DRX cycle timer". The short DRX cycle may also be initiated by means of a MAC Control Element. When the short DRX cycle timer expires, the UE moves into a long DRX cycle.

In addition to this DRX behavior, a 'HARQ Round Trip Time (RTT) timer' is defined with the aim of allowing the UE to sleep during the HARQ RTT. When decoding of a downlink transport block for one HARQ process fails, the UE can assume that the next retransmission of the transport block will occur after at least 'HARQ RTT' subframes. While the HARQ RTT timer is running, the UE does not need to monitor the PDCCH. At the expiry of the HARQ RTT timer, the UE resumes reception of the PDCCH as normal.

There is only one DRX cycle per user equipment. All aggregated component carriers follow this DRX pattern.

Buffer Status/Scheduling Request Reporting

The usual mode of scheduling is dynamic scheduling, by means of downlink assignment messages for the allocation of downlink transmission resources and uplink grant messages for the allocation of uplink transmission resources; these are usually valid for specific single subframes. They are transmitted on the PDCCH using C-RNTI of the UE as already mentioned before. Dynamic scheduling is efficient for services types, in which the traffic is bursty and dynamic in rate, such as TCP.

In addition to the dynamic scheduling, a persistent scheduling is defined, which enables radio resources to be semi-statically configured and allocated to a UE for a longer time period than one subframe, thus avoiding the need for specific downlink assignment messages or uplink grant messages over the PDCCH for each subframe. Persistent scheduling is useful for services such as VoIP for which the data packets are small, periodic and semi-static in size. Thus, the overhead of the PDCCH is significantly reduced compared to the case of dynamic scheduling.

Buffer status reports (BSR) from the UE to the eNodeB are used to assist the eNodeB in allocating uplink resources, i.e., uplink scheduling. For the downlink case, the eNB scheduler is obviously aware of the amount of data to be delivered to each UE; however, for the uplink direction, since scheduling decisions are done at the eNB and the buffer for the data is in the UE, BSRs have to be sent from the UE to the eNB in order to indicate the amount of data that needs to be transmitted over the UL-SCH.

Buffer Status Report MAC control elements for LTE consist of either: a long BSR (with four buffer size fields corresponding to LCG IDs #0-3) or a short BSR (with one LCG ID field and one corresponding buffer size field). The buffer size field indicates the total amount of data available across all logical channels of a logical channel group, and is indicated in number of bytes encoded as an index of different buffer size levels (see also 3GPP TS 36.321 v 12.4.0 Chapter 6.1.3.1, incorporated herewith by reference).

Which one of either the short or the long BSR is transmitted by the UE depends on the available transmission resources in a transport block, on how many groups of logical channels have non-empty buffers and on whether a specific event is triggered at the UE. The long BSR reports the amount of data for four logical channel groups, whereas the short BSR indicates the amount of data buffered for only the highest logical channel group.

The reason for introducing the logical channel group concept is that even though the UE may have more than four logical channels configured, reporting the buffer status for each individual logical channel would cause too much signaling overhead. Therefore, the eNB assigns each logical channel to a logical channel group; preferably, logical channels with same/similar QoS requirements should be allocated within the same logical channel group.

In order to be robust against transmission failures, there is a BSR retransmission mechanism defined for LTE; the retransmission BSR timer is started or restarted whenever an uplink grant is restarted; if no uplink grant is received before the retransmission BSR timer expires, another BSR is triggered by the UE.

A BSR is triggered for events, such as:

Whenever data arrives for a logical channel, which has a higher priority than the logical channels whose buffer is non-empty (i.e., whose buffer previously contained data);

Whenever data becomes available for any logical channel, when there was previously no data available for transmission (i.e., all buffers previously empty);

Whenever the retransmission BSR time expires;

Whenever periodic BSR reporting is due, i.e., periodic BSR timer expires; and

Whenever there is a spare space in a transport block which can accommodate a BSR.

More detailed information with regard to BSR and in particular the triggering of same is explained in 3GPP TS 36.321 v12.4.0 in subclause 5.4.5 incorporated herewith by reference.

If the UE has no uplink resources allocated for including a BSR in the transport block when a BSR is triggered, the UE sends a scheduling request (SR) to the eNodeB so as to be allocated with uplink resources to transmit the BSR. Either a single-bit scheduling request is sent over the PUCCH (dedicated scheduling request, D-SR), or the random access procedure (RACH) is performed to request an allocation of an uplink radio resource for sending a BSR.

However, for sake of completion it should be noted that the UE will not trigger the transmission of the scheduling request for the case that a periodic BSR is to be transmitted.

Furthermore, an enhancement to the SR transmission has been introduced for the specific scheduling mode where resources are persistently allocated with a defined periodicity in order to save L1/L2 control signaling overhead for transmission grants, which is referred to as semi-persistent scheduling (SPS). One example for a service, which has been mainly considered for semi-persistent scheduling, is VoIP. Every 20 ms a VoIP packet is generated at the Codec during a talking spurt. Therefore, the eNodeB can allocate uplink or respectively downlink resources persistently every 20 ms, which could then be used for the transmission of VoIP packets. In general, SPS is beneficial for services with predictable traffic behavior, i.e., constant bit rate, packet arrival time is periodic. For the case where SPS is configured for the uplink direction, the eNodeB can turn off SR triggering/transmission for certain configured logical channels, i.e., BSR triggering due to data arrival on those specific configured logical channels will not trigger an SR. The motivation for such kind of enhancements is that sending a scheduling request for those logical channels which will use the semi-persistently allocated resources (logical channels which carry VoIP packets) is of no value for eNB scheduling and hence should be avoided.

FIG. 8 illustrates in an exemplary way the UE behavior relating to BSR/SR when data arrives in the transmission buffer of the UE (UE Tx buffer). For explanatory purposes the following somewhat simplified scenario is assumed. Only one transmission buffer and one logical channel of a UE is considered. The transmission buffer is assumed to be empty at the beginning, i.e., no data is stored in the transmission buffer. Furthermore, the UE shall not have uplink resources to transmit a buffer status report to the eNodeB. However, the UE shall have semi-statically-allocated resources (e.g., allocated by means of RRC signaling) available in the PUCCH for transmitting a scheduling request (may also be referred to as dedicated scheduling request, D-SR), when necessary; i.e., performing a RACH procedure to send the scheduling request is thus not necessary, which simplifies the illustration.

This simplified scenario shall not be understood as limiting. Similar considerations apply to scenarios additionally including transmission buffers of other logical channels, as well as scenarios where the transmission buffers of a logical channel group, which consists of the transmission buffers of several logical channels, are considered together. Also, the transmission buffer(s) need not be empty; in said case, however, the new data (i.e., the data that currently arrives) entering the transmission buffer of the UE shall have a higher priority than the data already previously stored in the transmission buffer. Moreover, instead of using the allocated resources of the PUCCH for transmitting the SR, the UE might have to perform a RACH procedure to transmit the scheduling request in case no such D-SR uplink resources are available; in the present application, the expressions "scheduling request occasion" (also "scheduling request transmission occasion") are used to refer to both, i.e., to a dedicated SR and to the RACH procedure.

When new data arrives in the transmission buffer of the UE at time t1, the UE has to first request uplink resources for transmission of the data since no appropriate uplink resources are momentarily available in said respect. Thus, according to the standard trigger condition as explained above, a BSR is triggered in the UE, and in view of the lack of uplink resources for transmitting even the BSR, a scheduling request is triggered in the UE for transmission.

The UE uses the (periodically) allocated PUCCH resources (or RACH procedure not shown in FIG. 8) to transmit the scheduling request to the eNodeB so as to request the eNodeB to allocate uplink resources to the UE. Accordingly, the eNodeB allocates some UL-SCH resources to the UE. Depending, e.g., on the current resource usage in the uplink, the eNodeB may allocate less or more uplink resources to the UE in response to the SR, and will transmit a corresponding uplink grant via the PDCCH.

Upon receiving the uplink grant message, the UE may or may not transmit data in addition to the BSR, depending on the amount of allocated PUSCH resources. When generating the BSR, this is considered by the UE, such that the BSR indicates the amount of data in the transmission buffer after transmitting the BSR and possibly data of the transmission buffer.

Thus, the UE will transmit over the PUSCH only the BSR, or may also include some data of the UE transmission buffer. In FIG. 8, in the first signaling exchange, it is assumed that the UE can transmit all data of the transmission buffer to the eNodeB using the uplink resources assigned by the eNodeB in response to the SR. Correspondingly, the BSR informs the eNodeB about basically an empty transmission buffer, such that no further uplink grant is necessary to be allocated.

However, usually more than one uplink transmission will be necessary in order to empty the transmission buffer, as is also illustrated in FIG. 8 in connection with new data arriving at time t2. In this case, the amount of data is larger than the data becoming available in the transmission buffer at time t1. However, the above procedure basically repeats itself as illustrated, with the exception that the PUSCH transmission, including the BSR and the data, does not suffice to empty the transmission buffer. Correspondingly, the BSR generated by the UE at the time of transmission informs the eNodeB about the remaining data in the transmission buffer. The eNodeB thus will allocate to the UE further uplink resources in correspondence with the remaining data in the transmission buffer. A further uplink grant message is transmitted by the eNodeB to the UE, which in turn can then use the newly-assigned uplink resources to transmit the remaining data, and thus empty its transmission buffer.

Each time new data arrives in the buffer, this basic procedure (or similar) will be repeated.

There has been already in the past discussion during various work items like DDA (Diverse Data Application) with the main goal to identify and specify mechanisms at the radio access network level that enable enhancing the ability of the LTE to handle diverse traffic profiles. In particular, one major goal is to reduce the power usage of the terminals in order to extend the battery life. Also, for certain MTC (machine-type-communication) devices, low power consumption might be a very critical requirement. Hence, some enhancements for minimizing the power consumption were already discussed for services with a specific traffic profile.

This is particularly important for certain types of traffic where the frequency of scheduling request transmissions is quite high due to many small uplink transmissions; for example, for normal interactive TCP traffic where there is a need to send requests for frequent TCP ACKs, or for conversion of speech and/or video traffic which has frequently occurring uplink transmissions. The frequent transmission of scheduling requests will obviously increase the power consumption of the user equipment and also increases the load on the scheduling request channel, as well as the number of PDCCH grants in response to the received scheduling requests.

Very recently, an improvement to the above-discussed BSR/SR reporting mechanism was introduced in the 3GPP standardization. Basically, so as to reduce the power consumption of the user equipment, the triggering of a scheduling request is delayed for some predefined time. By delaying the triggering of the scheduling request, the number of scheduling requests can be reduced, since, due to the delay, the corresponding BSR may take into account additional data arriving in the transmission buffer(s) after the initial new-data trigger until the delay expires.

For said purpose, it was agreed to introduce a dedicated timer logicalChannelSR-ProhibitTimer and configure a corresponding timer value logicalChannelSR-ProhibitTimer-r12 with seven different timer values as 20, 40, 64, 1238, 512, 1024, and 2560 subframes (ms); see information element MAC-MainConfig in 3GPP TS 36.331 v12.4.1 incorporated herewith by reference. As can be appreciated from 3GPP TS 36.321 v12.4.0, subclause 5.4.5 "Buffer Status Reporting", incorporated herein by reference, the triggering of a scheduling request (if a Regular BSR has been triggered) is additionally dependent on that the logicalChannelSR-ProhibitTimer is not running.

Obviously, for some kind of data, the additional delay may be tolerated, while for other traffic scenarios it is important to send the scheduling request/buffer status report as quickly as possible. Consequently, the delay feature is configured specifically for particular logical channels, e.g., those which can tolerate some delay; put differently, the delay feature is thus logical channel specific. Therefore, the eNodeB can configure for each logical channel whether a delay for the triggering of the scheduling request shall be applied or not. This can be done by way of the information element LogicalChannelConfig and the corresponding optional Boolean variable logicalChannelSR-Prohibit-r12; see information element LogicalChannelConfig in 3GPP TS 36.331 v12.4.1 incorporated herewith by reference.

The effect of this new delay feature will be illustrated in connection with FIG. 9, which assumes a similar scenario as for FIG. 8, and illustrates the triggering of a BSR and SR. Only one transmission buffer and one logical channel of a UE is considered, for simplicity. The transmission buffer is assumed to be empty at the beginning, i.e., no data is stored in the transmission buffer. Furthermore, the UE shall not have sufficient uplink resources to transmit a buffer status report to the eNodeB. However, the UE shall have semi-statically-allocated resources (e.g., allocated by means of RRC signaling) available in the PUCCH for transmitting a scheduling request (may also be referred to as dedicated scheduling request, D-SR), when necessary; i.e., performing a RACH procedure to send the scheduling request is thus not necessary, which simplifies the illustration. Furthermore, it is assumed that the one logical channel of the scenario is configured for the SR delay function, as explained above.

When new data arrives in the transmission buffer of the UE at time t1, in the absence of corresponding uplink resources, a buffer status report cannot be transmitted immediately in the uplink, and thus the UE has to first request uplink resources for transmission of the buffer status report by transmission of a scheduling request. Since the data that triggered the BSR is associated with a logical channel for which the scheduling request (trigger) delay feature was configured, instead of immediately triggering the transmission of the scheduling request, the triggering is delayed by a fixed amount of time according to the preconfigured prohibition timer value, as explained above. In other words, the scheduling request prohibition timer is started when the (Regular) BSR has been triggered, and, while the scheduling request prohibition timer is running, the triggering of the scheduling request is not executed, i.e., it is delayed. On the other hand, after the scheduling request prohibition timer expires, the scheduling request is finally triggered, and the UE can transmit the scheduling request to the eNodeB in the next scheduling request occasion (i.e., by using the periodically allocated PUCCH resources shown in FIG. 9, or the RACH procedure not shown in FIG. 9).

As with the procedure explained before in connection with FIG. 8, the eNodeB allocates UL-SCH resources to the UE, and transmits a corresponding uplink grant via the PDCCH. Upon receiving the uplink grant message, the UE may or may not transmit data in addition to the BSR, depending on the amount of allocated PUSCH resources. In the particular example assumed for FIG. 9, the UE can transmit all data of the transmission buffer to the eNodeB using the uplink resources assigned by the eNodeB in response to the scheduling request. Correspondingly, the buffer status report informs the eNodeB about basically an empty transmission buffer such that no further uplink grant is necessary to be allocated.

FIG. 9 additionally illustrates the case where first data arrives in the transmission buffer at time t2, and additional data arrives in the same transmission buffer at time t3. The arrival of new data in the empty transmission buffer at time t2 triggers the buffer status report, which, however, at basically the same time, also would trigger the transmission of a scheduling request (since no corresponding uplink resources are available for immediately transmitting the buffer status report). Again, the scheduling request trigger is delayed by use of the corresponding prohibition timer, started upon arrival of the new data in the transmission buffer (i.e., the triggering of the BSR). The additional data arriving at time t3 is taking into account by the user equipment when generating the BSR to be transmitted in the uplink to the eNodeB, which would not be the case without the scheduling request delay. Consequently, the transmission of a further scheduling request is avoided, and power consumption can be reduced.

BRIEF SUMMARY

One non-limiting and exemplary embodiment provides an improved method for requesting uplink radio resources in a communication system by transmission of a scheduling request from the user equipment to the radio base station.

The independent claims provide non-limiting and exemplary embodiments. Advantageous embodiments are subject to the dependent claims.

According to a first aspect, the disclosure improves the procedure of requesting uplink resources through transmission of a scheduling request to the radio base station by flexibly delaying the triggering or transmission of the scheduling request such that the user equipment does not need to transit to Active Time just due to said triggered scheduling request but rather is already in Active Time (or more specifically, e.g., in On-Duration of the DRX cycle). Put differently, the flexible delay of the triggering or transmission of the scheduling request according to the first aspect avoids that the user equipment needs to transit to Active Time merely in connection with said triggered scheduling request, but rather ensures that the delay is such that the user equipment is in Active Time anyway and thus can handle the BSR/SR procedure in said time period.

To that end, it may be assumed that the scheduling request is triggered upon the triggering of a buffer status report (which in turn may be triggered by arrival of new data in a transmission buffer of the user equipment). However, according to one example, the triggering of the scheduling request is actually delayed until one of the subframes where the user equipment is in Active Time, be it a subframe of the On-Duration period or another Active Time period in which the user equipment is active, which ensures that the user equipment is already active. Thus, the need for the UE to transit to Active Time is avoided specifically in connection with the triggered scheduling request for the purpose of monitoring the downlink control channel for a corresponding uplink grant transmitted by the radio base station in response to the scheduling request. In other words, instead of providing a fixed delay, the first aspect suggests introducing a flexible delay depending on the DRX functionality, so as to postpone the BSR/SR procedure to be executed by the user equipment during an Active Time that is caused by another reason than the triggered scheduling request.

As explained in the background section, a user equipment can be active for various reasons, one among them being the periodic On-Duration period, others being, e.g., the time the UE is performing continuous reception while the inactivity timer has not expired, and the time the UE is performing continuous reception while waiting for a downlink retransmission after one HARQ RTT.

After the delay of the triggering expires, the triggering of the scheduling request can finally be executed by the user equipment, and then the triggered scheduling request can be transmitted by the user equipment to the radio base station in the next possible scheduling request transmission occasion.

Alternatively, instead of delaying the trigger of the scheduling request, the trigger of the scheduling request is indeed executed but the transmission of the scheduling request is delayed such that the user equipment does not need to transit to Active Time just due to said triggered scheduling request, but rather is already in Active Time (or more specifically, e.g., in the On-Duration period of the DRX cycle). As before, according to one example, the transmission of the scheduling request is actually delayed such that it is performed in one of the subframes where the user equipment is already in Active Time, be it a subframe of the On-Duration period or another Active Time period in which the user equipment is already active. The effect is the same as for the first alternative, namely that the need to transit to Active Time specifically in connection with the triggered scheduling request for the purpose of monitoring the downlink control channel for a corresponding uplink grant transmitted by the radio base station in response to the scheduling request is avoided.

According to variants of the first aspect, the scheduling request is delayed at least for a particular minimum amount of time. Instead or additionally, the scheduling request shall be delayed at most a maximum amount of time. The minimum amount of time and/or the maximum amount of time can be decided by the radio base station and be transmitted to the user equipment accordingly.

According to further variants of the first aspect, the above discussed flexible delay should not be applicable to all available logical channels, but only to particular logical channels. Correspondingly, the transmission or triggering of the scheduling request shall be delayed only when the data, which arrives in the transmission buffer and triggers the buffer status report, which in turn triggers the scheduling request, is associated with a logical channel for which the scheduling request delay is configured. For example, such a specific logical channel can be associated with delay-tolerant data.

Correspondingly, in one general aspect, the techniques disclosed here feature a method for requesting uplink resources by a user equipment in a communication system. A DRX, Discontinued Reception, function is running at the user equipment. The transmission of a scheduling request is triggered in the UE for requesting uplink resources to a radio base station upon triggering of a buffer status report in the user equipment. The triggering of the scheduling request is delayed by the UE such that the scheduling request is triggered in one of the subframes—preferably the first subframe—of an On-Duration period of a DRX cycle according to the DRX function. Then, the triggered scheduling request is transmitted by the UE to the radio base station in the next possible scheduling request transmission occasion after the triggering of the scheduling request is delayed.

According to an advantageous variant which can be used in addition or alternatively to the above, the triggering of the scheduling request is delayed at least for a preconfigured minimum delay time and preferably not more than a preconfigured maximum delay time. For example, the preconfigured minimum delay time is determined at the radio base station, and the user equipment receives from the radio base station an indication on the preconfigured minimum delay time.

According to an advantageous variant which can be used in addition or alternatively to the above, the user equipment receives configuration information from the radio base station on how to delay the triggering of the scheduling request, the configuration information including one out of a plurality of codepoints where at least one of the plurality of codepoints indicates that the triggering of the scheduling request shall be delayed such that the scheduling request is triggered in one of the subframes—e.g., the first subframe—of an On-Duration period of the DRX cycle. For example, the remaining codepoints indicate a fixed delay time for delaying the triggering of the scheduling request.

According to an advantageous variant which can be used in addition or alternatively to the above, the step of delaying is performed using a starting request prohibition timer, wherein the triggering of the scheduling request may not be executed while the scheduling request prohibition timer is running. For example, the scheduling request prohibition timer is started upon triggering of the buffer status report in the user equipment. Then, the scheduling request prohibition timer is started with a timer value calculated by the user equipment to be the amount of time between the one of the subframes—e.g., the first subframe—of said On-Duration period of the DRX cycle and the subframe where the prohibition timer is started.

According to an advantageous variant which can be used in addition or alternatively to the above, a plurality of logical channels are configured for the user equipment, and a buffer status report is triggered upon arrival of new data in a transmission buffer associated with any of the plurality of logical channels. The delaying of the triggering of the scheduling request is only performed when the buffer status report, triggering the scheduling request, is triggered by arrival of new data associated with at least one specific logical channel out of the plurality of logical channels, preferably wherein the specific logical channel is associated with delay-tolerant data. Furthermore, for example, the radio base station determines the at least one specific logical channel out of the plurality of logical channels, and the user equipment receives from the radio base station an indication on the at least one specific logical channel.

Correspondingly, in one general aspect, the techniques disclosed here feature a user terminal for requesting uplink resources from a radio base station in a communication system. A DRX, Discontinued Reception, function is running at the user equipment. A processor of the UE triggers the transmission of a scheduling request for requesting uplink resources to the radio base station upon triggering of a buffer status report in the user equipment. The processor delays the triggering of the scheduling request such that the scheduling request is triggered in one of the subframes— preferably the first subframe—of an On-Duration period of a DRX cycle according to the DRX function. A transmitter of the UE transmits the triggered scheduling request to the radio base station in the next possible scheduling request transmission occasion after the triggering of the scheduling request is delayed.

According to an advantageous variant which can be used in addition or alternatively to the above, the processor delays the triggering of the scheduling request at least for a preconfigured minimum delay time and preferably not more than a preconfigured maximum delay time. Furthermore, for example, a receiver of the user equipment is adapted to receive from the radio base station an indication on the preconfigured minimum delay time determined at the radio base station.

According to an advantageous variant which can be used in addition or alternatively to the above, a receiver receives configuration information from the radio base station on how to delay the triggering of the scheduling request, the configuration information including one out of a plurality of codepoints where at least one of the plurality of codepoints indicates that the triggering of the scheduling request shall be delayed such that the scheduling request is triggered in one of the subframes—e.g., the first subframe—of an On-Duration period of the DRX cycle.

According to an advantageous variant which can be used in addition or alternatively to the above, a starting request prohibition timer is provided in the UE, wherein the triggering of the scheduling request may not be executed while the scheduling request prohibition timer is running. Furthermore, for example, the processor starts the scheduling request prohibition timer upon triggering of the buffer status report, calculates the amount of time between the one of the subframes—e.g., the first subfram—of said On-Duration period of the DRX cycle and the subframe where the prohibition timer is started, and uses the calculated amount of time as timer value for starting the scheduling request prohibition timer.

According to an advantageous variant which can be used in addition or alternatively to the above, the user equipment is configured with a plurality of logical channels, and a buffer status report is triggered upon arrival of new data in a transmission buffer associated with any of the plurality of logical channels. The delaying of the triggering of the scheduling request is only performed when the buffer status report, triggering the scheduling request, is triggered by arrival of new data associated with at least one specific logical channel out of the plurality of logical channels. Furthermore, for example, a receiver of the user equipment receives an indication from the radio base station on the at least one specific logical channel Correspondingly, in one general aspect, the techniques disclosed here feature a method for requesting uplink resources by a user equipment in a communication system. A DRX, Discontinued Reception, function is running at the user equipment. The transmission of a scheduling request is triggered by the UE for requesting uplink resources to a radio base station upon triggering of a buffer status report in the user equipment. The transmission of the triggered scheduling request is delayed by the UE until the user equipment is in Active Time of the DRX function. The triggered scheduling request is transmitted by the UE to the radio base station after the delay and when the user equipment is in Active Time of the DRX function.

According to an advantageous variant which can be used in addition or alternatively to the above, the user equipment is in Active Time of the DRX function for another reason than in connection with the triggered scheduling request when transmitting the triggered scheduling request.

According to an advantageous variant which can be used in addition or alternatively to the above, the delay step is performed by determining the next possible scheduling request transmission occasion for transmitting the triggered scheduling request that is at a time when the user equipment is in Active Time according to the DRX function for another reason than in connection with the triggered scheduling request. Furthermore, for example, this can be achieved by, first, determining whether the user equipment, at the next scheduling request transmission occasion for transmitting the triggered scheduling request, is in Active Time according to the DRX function for another reason than in connection with the triggered scheduling request, second, if the user equipment is determined to be in Active Time, transmitting the triggered scheduling request to the radio base station in said next scheduling request transmission occasion, and third, if the user equipment is determined not to be in Active Time, not becoming active and not transmitting the triggered scheduling request in said next scheduling request transmission occasion. The three steps can be repeated for subsequent scheduling requests transmission occasions until the triggered scheduling request is transmitted.

According to an advantageous variant which can be used in addition or alternatively to the above, the delay step is performed by determining the next possible scheduling request transmission occasion for transmitting the triggered scheduling request that is in one of the subframes of an On-Duration period of a DRX cycle according to the DRX function running at the user equipment. For example, this may be achieved by, first, determining whether the next scheduling request transmission occasion for transmitting the triggered scheduling request is during an On-Duration period of the DRX cycle, second, if yes, transmitting the triggered scheduling request to the radio base station in said next scheduling request transmission occasion, and third, if not, not transmitting the triggered scheduling request in said next scheduling request transmission occasion. The three steps can be repeated for subsequent scheduling requests transmission occasions until the triggered scheduling request is transmitted.

According to an advantageous variant which can be used in addition or alternatively to the above, a plurality of logical channels are configured for the user equipment, and a buffer status report is triggered upon arrival of new data in a transmission buffer associated with any of the plurality of logical channels, wherein the delaying of the transmission of the scheduling request is only performed when the buffer status report, triggering the scheduling request, is triggered by arrival of new data associated with at least one specific logical channel out of the plurality of logical channels, preferably wherein the specific logical channel is associated with delay-tolerant data.

According to an advantageous variant which can be used in addition or alternatively to the above, wherein a scheduling request transmission occasion is either an occasion for transmitting a scheduling request in an uplink radio resource of an uplink control channel, or an occasion for transmitting a scheduling request by performing a random access channel procedure between the user equipment and the radio base station. Correspondingly, in one general aspect, the techniques disclosed here feature a user terminal for requesting uplink resources from a radio base station in a communication system. A DRX, Discontinued Reception, function is running at the user equipment. A processor of the UE triggers the transmission of a scheduling request for requesting uplink resources to the radio base station upon triggering of a buffer status report in the user equipment. The processor further delays the transmission of the triggered scheduling request until the user equipment is in Active Time of the DRX function. A transmitter of the UE transmits the triggered scheduling request to the radio base station after the delay and when the user equipment is in Active Time of the DRX function.

According to an advantageous variant which can be used in addition or alternatively to the above, the user equipment is in Active Time of the DRX function for another reason than in connection with the triggered scheduling request when transmitting the triggered scheduling request.

According to an advantageous variant which can be used in addition or alternatively to the above, the processor is adapted to determine the next possible scheduling request transmission occasion for transmitting the triggered scheduling request that is at a time when the user equipment is in Active Time according to the DRX function for another reason than in connection with the triggered scheduling request. For example, this can be achieved by, first, determining whether the user equipment, at the next scheduling request transmission occasion for transmitting the triggered scheduling request, is in Active Time according to the DRX function for another reason than in connection with the triggered scheduling request, second, if the user equipment is determined to be in Active Time, transmitting the triggered scheduling request to the radio base station in said next scheduling request transmission occasion, and third, if the user equipment is determined not to be in Active Time, not becoming active and not transmitting the triggered scheduling request in said next scheduling request transmission occasion. The three steps can be repeated for subsequent scheduling requests transmission occasions until the triggered scheduling request is transmitted.

According to an advantageous variant which can be used in addition or alternatively to the above, the processor is adapted to determine the next possible scheduling request transmission occasion for transmitting the triggered scheduling request that is in one of the subframes of an On-Duration period of a DRX cycle according to the DRX function running at the user equipment. This can be achieved by, first, determining whether the next scheduling request transmission occasion for transmitting the triggered scheduling request is during an On-Duration period of the DRX cycle, second, if yes, transmitting the triggered scheduling request to the radio base station in said next scheduling request transmission occasion, and third, if not, not transmitting the triggered scheduling request in said next scheduling request transmission occasion. The three steps can be repeated for subsequent scheduling requests transmission occasions until the triggered scheduling request is transmitted.

According to an advantageous variant which can be used in addition or alternatively to the above, the user equipment is configured with a plurality of logical channels, a buffer status report is triggered upon arrival of new data in a transmission buffer associated with any of the plurality of logical channels, wherein the delaying of the transmission of the scheduling request is only performed when the buffer status report, triggering the scheduling request, is triggered by arrival of new data associated with at least one specific logical channel out of the plurality of logical channels. Furthermore, for example, a receiver of the user equipment receives an indication from the radio base station on the at least one specific logical channel. Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE FIGURES

In the following exemplary embodiments are described in more detail with reference to the attached figures and drawings.

FIG. 11 illustrates the timing of the BSR/SR triggering and subsequent transmissions of SR, UL grant and BSR, using a flexible scheduling request delay according to various exemplary embodiments, FIG. 13 illustrates the timing of the BSR/SR triggering and subsequent transmissions of SR, UL grant and BSR, using a flexible scheduling request delay according to various exemplary embodiments.

DETAILED DESCRIPTION

Figure 1:
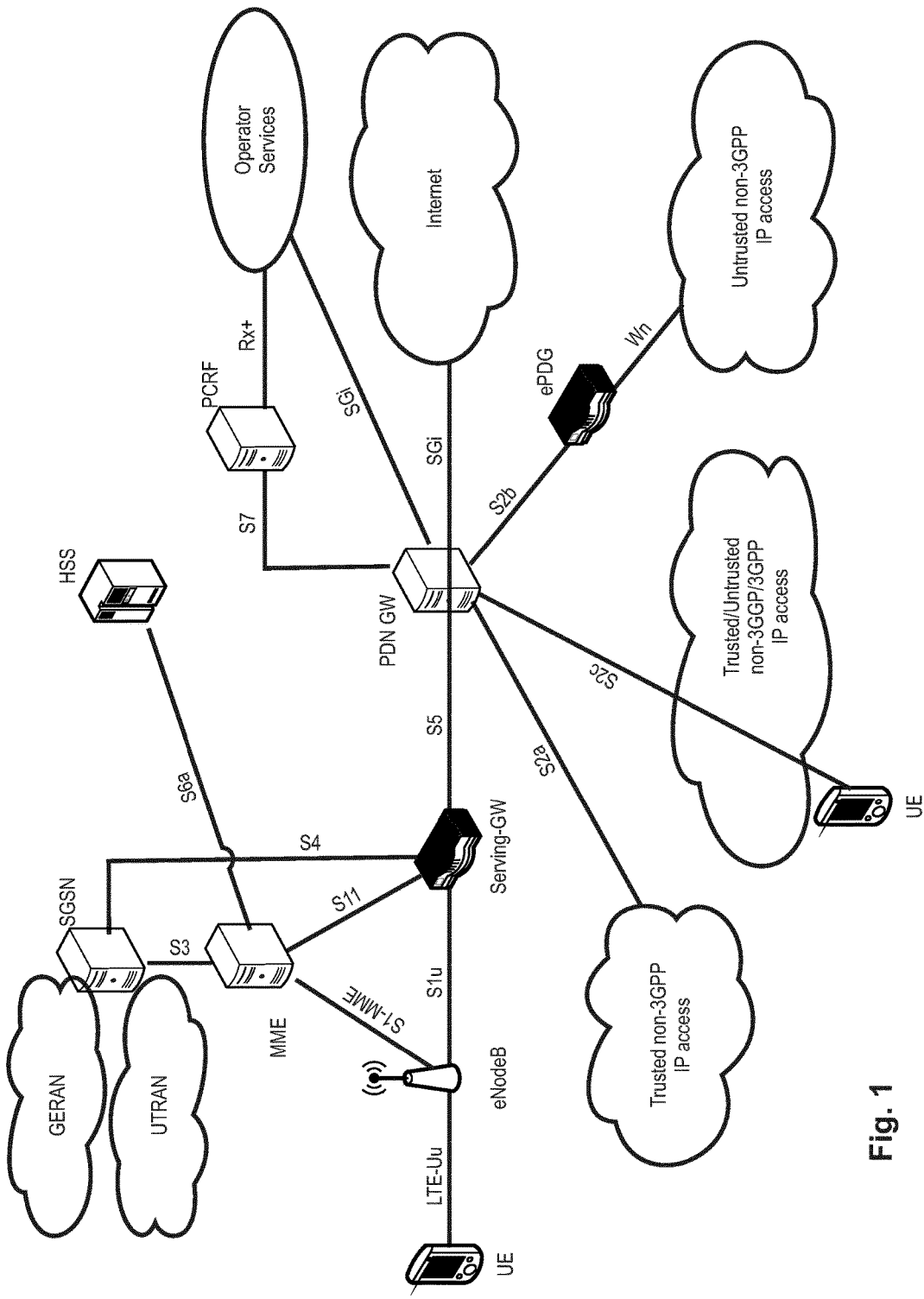
FIG. 1 shows an exemplary architecture of a 3GPP LTE system.
Figure 2:
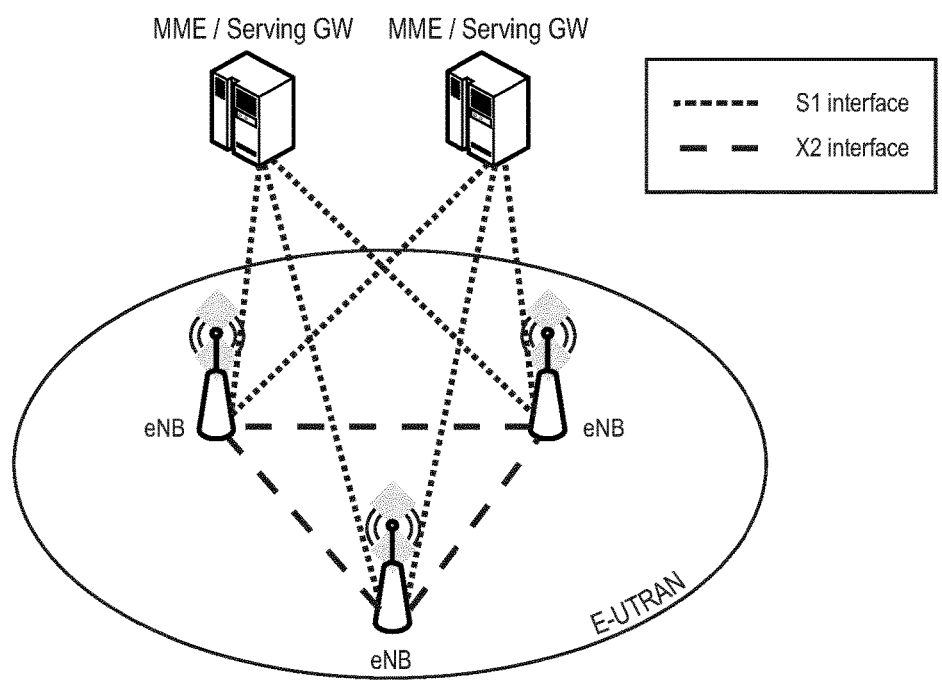
FIG. 2 shows an exemplary overview of the overall E-UTRAN architecture of 3GPP LTE.
Figure 3:
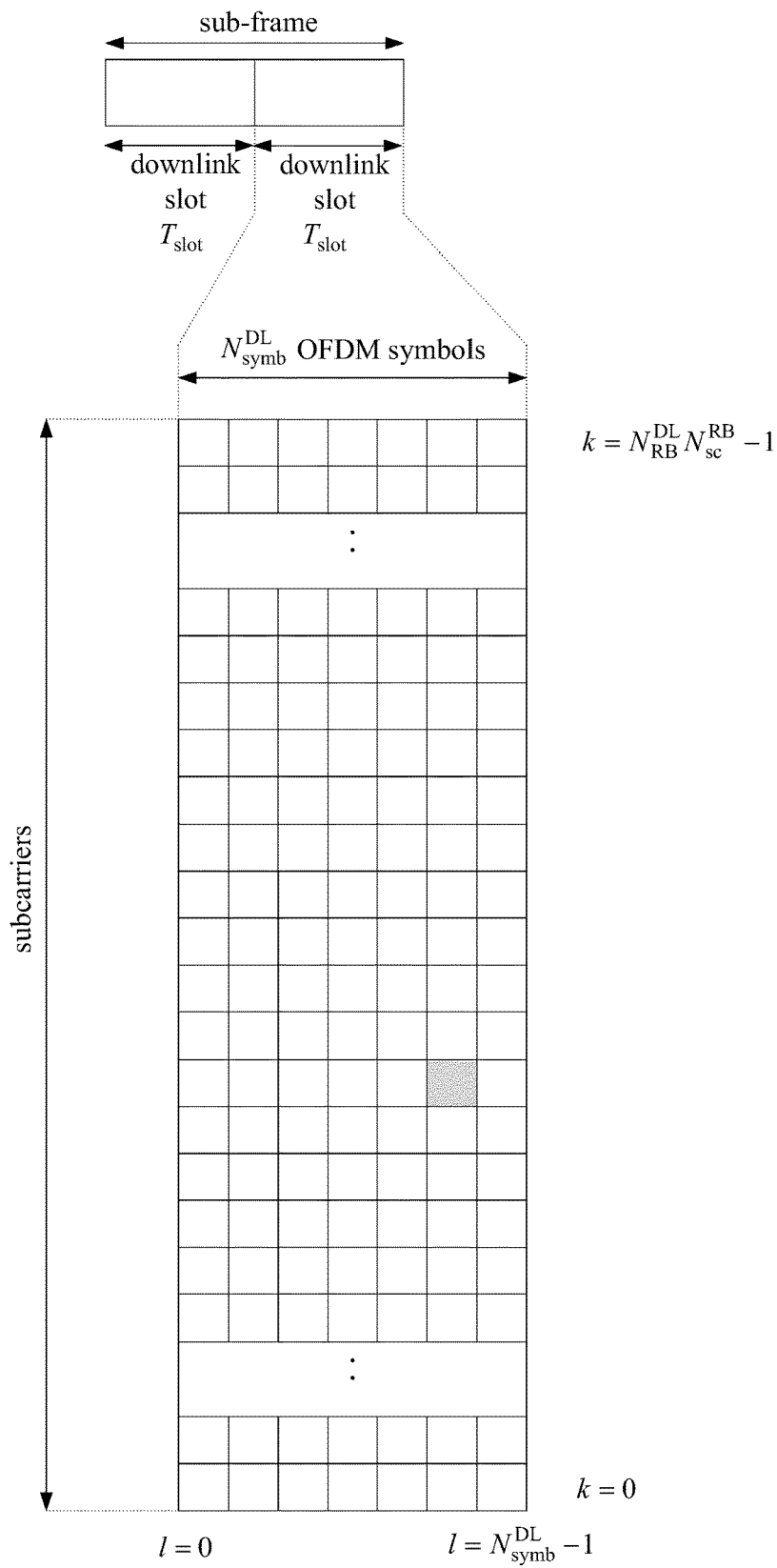
FIG. 3 shows exemplary subframe boundaries on a downlink component carrier as defined for 3GPP LTE (Release 8/9)
Figure 4:
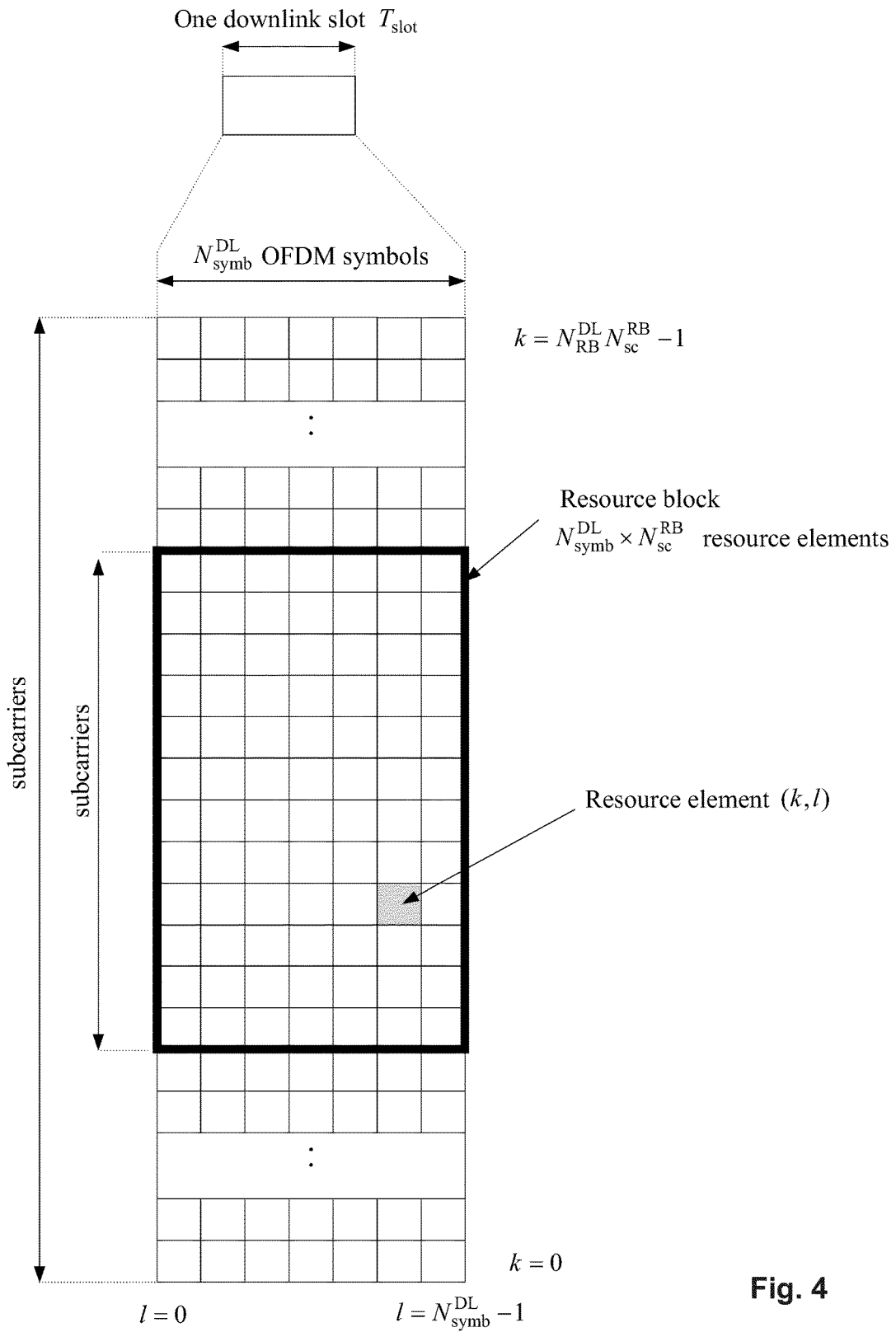
FIG. 4 shows an exemplary downlink resource grid of a downlink slot as defined for 3GPP LTE (Release 8/9)
Figure 5:
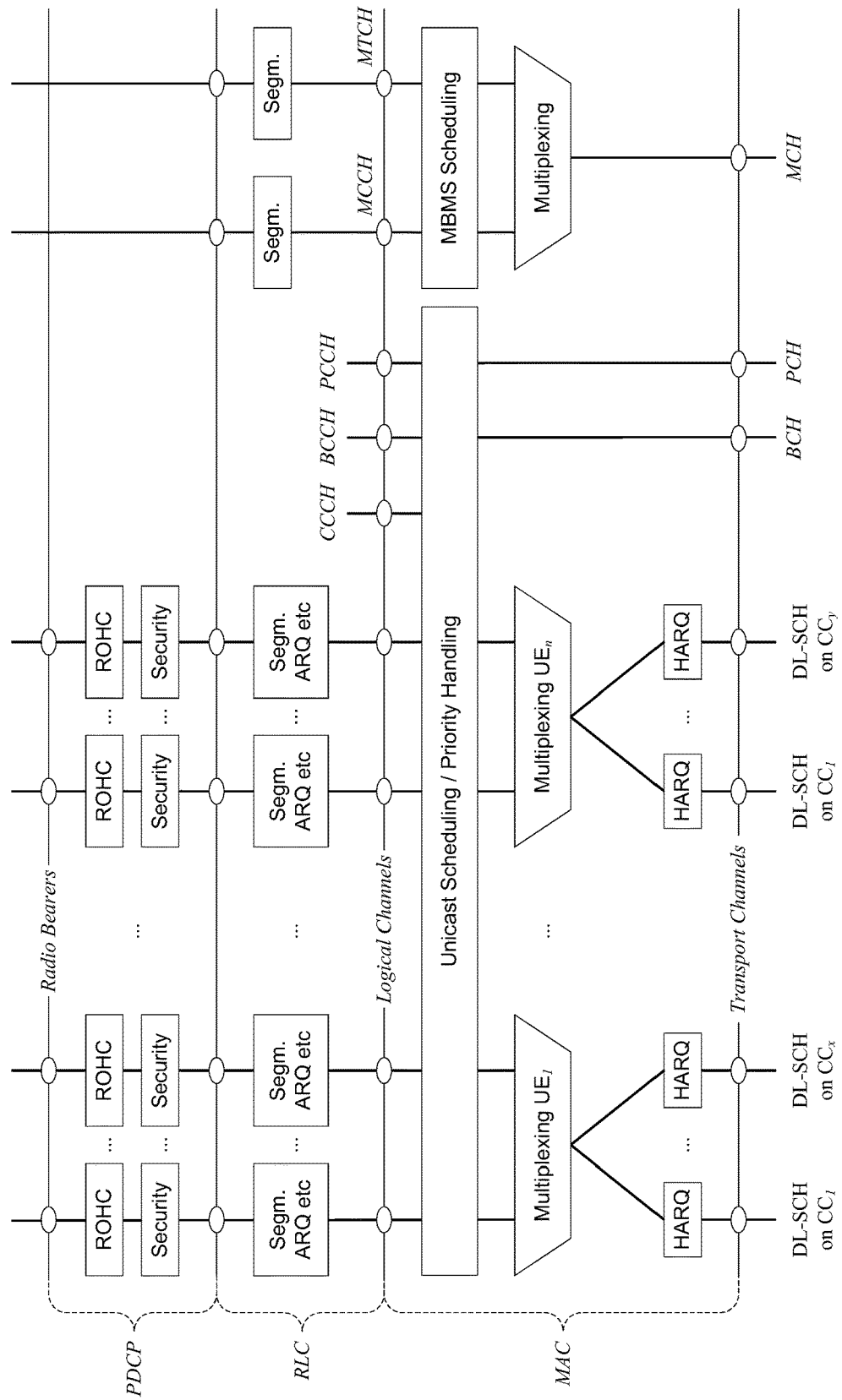
FIG. 5 and FIG. 6 show the 3GPP LTE-A (Release 10) Layer 2 structure with activated carrier aggregation for the downlink and uplink, respectively.
Figure 6:
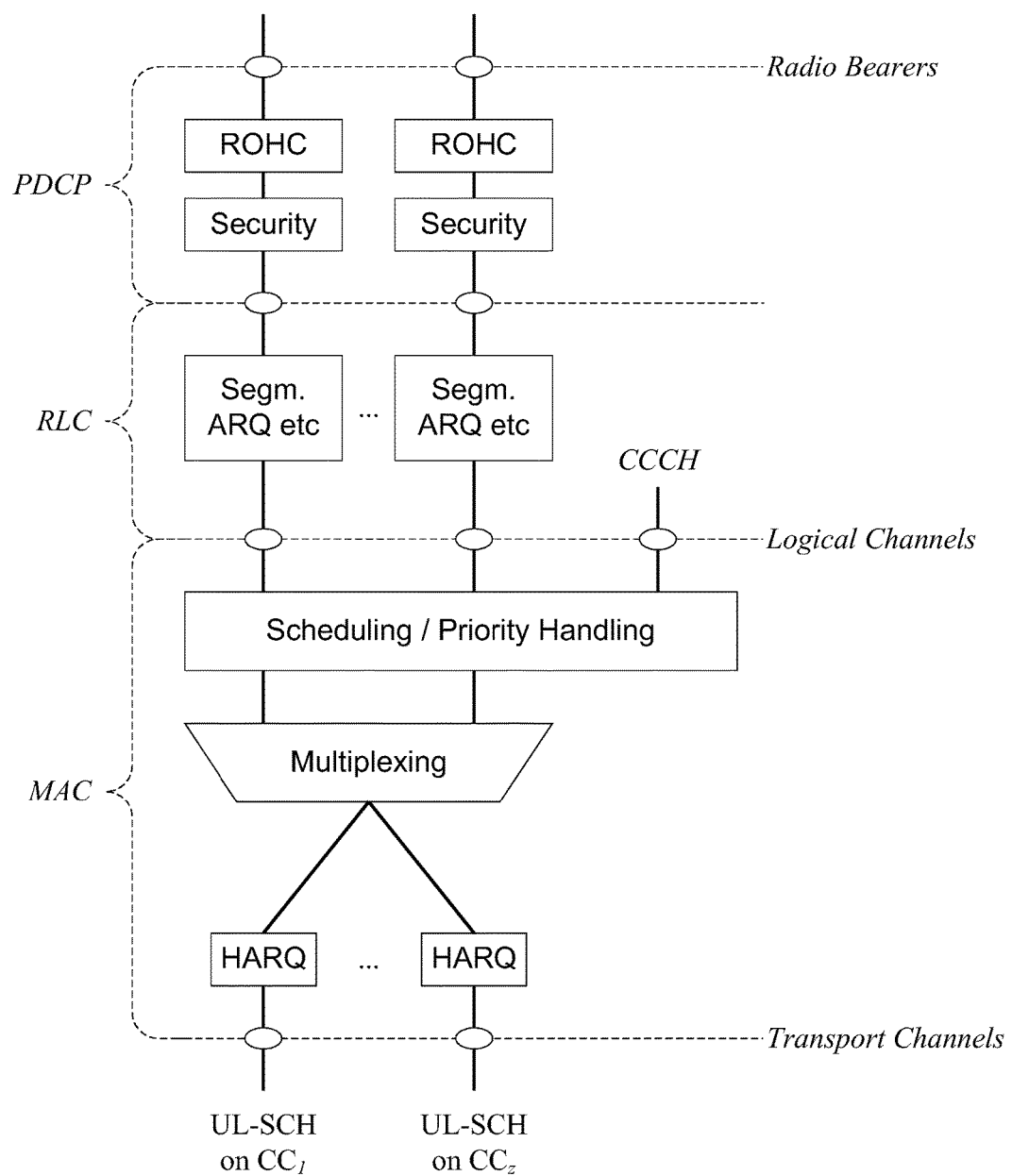

It should be noted that the embodiments may be advantageously used, for example, in a mobile communication system such as 3GPP LTE-A (Release 10/11/12) communication systems as described in the Description of the Related Art section above, but the embodiments are not limited to its use in this particular exemplary communication networks.

A mobile station or mobile node or user terminal is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The terms "scheduling request transmission occasion" and "scheduling request occasion" shall be understood broadly as an opportunity for the user equipment to request uplink resources from the radio base station. For example, this can be in the form of a dedicated scheduling request message transmitted to the radio base station via uplink radio resources on an uplink control channel. Alternatively, this could, for example, also be within a random access channel procedure.

The term "new data" used in the claims and in the description is to be understood as data that arrives/is stored in the transmission buffer which was previously not there. This data (data packets) is received from a higher layer, e.g., PDCP layer, and placed into the transmission buffer.

The term "arrival" used in the claims and in the description with regard to data and transmission buffers shall be understood as when that data which is to be transmitted by the user equipment "enters", or "is put into", or "is temporarily stored in" the transmission buffer of the corresponding logical channel for transmission.

The different terminology of "next", "next possible" is used in the claims and in the description to distinguish between different scheduling request occasions, namely between one that can effectively be used for transmitting the scheduling request but may not directly be the next one (i.e., "next possible"), and a scheduling request occasion which is directly subsequent (i.e., "next").

The expression "delaying the triggering of the scheduling request" used in the claims and in the description shall cover the concept that, although a scheduling request was (would be) triggered (e.g., since the buffer status report was triggered and assuming that no uplink resource is available to transmit the BSR), the execution of the triggering is postponed (i.e., delayed) for some time.

As explained in the background section, one major goal is to reduce the power usage of terminals in order to extend the battery life, which can be particularly critical for MTC devices. By introducing the new scheduling request delay feature, 3GPP standardization allows reducing the power consumption, as explained in the background section. It is important to note that there is only one timer value of logicalChannelSR-ProhibitTimer-r12 configured per UE, which essentially means that the scheduling request is delayed for all logical channels (i.e., those for which scheduling request delaying has been configured) by the same amount of time.

Figure 9:
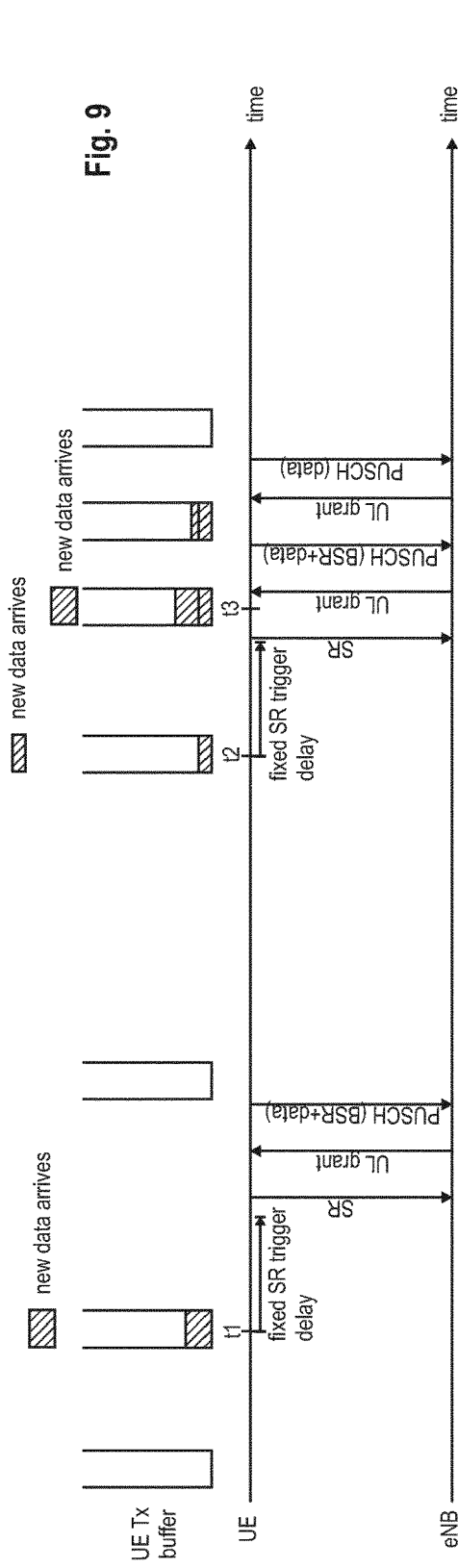
FIG. 9 illustrates in a simplified scenario the buffer status report and scheduling request triggering in the user equipment caused by arrival of new data in the transmission buffer of the user equipment additionally implementing the delay function of the scheduling request according to the prior art.

While it can be assumed that the new delay function introduced by 3GPP indeed allows reducing the power consumption of the user equipment, it still remains a goal to further improve the BSR/SR function to further reduce power consumption in the user equipment. The scheduling request delay function explained in connection with FIG. 9 fails to consider the DRX, discontinued reception, functionality operating on the user equipment.

In general (i.e., with and without SR delay), when a user equipment is in the sleep mode, i.e., in DRX state, and a BSR/SR is triggered, the UE transmits the scheduling request to the eNodeB in the uplink, and has to wake up and transit to Active Time in order to monitor for and receive the corresponding uplink grant transmitted by the eNodeB on the PDCCH. This consumes power and drains the battery considerably, especially for certain types of traffic where the frequency of scheduling request transmissions is quite high.

Figure 8:
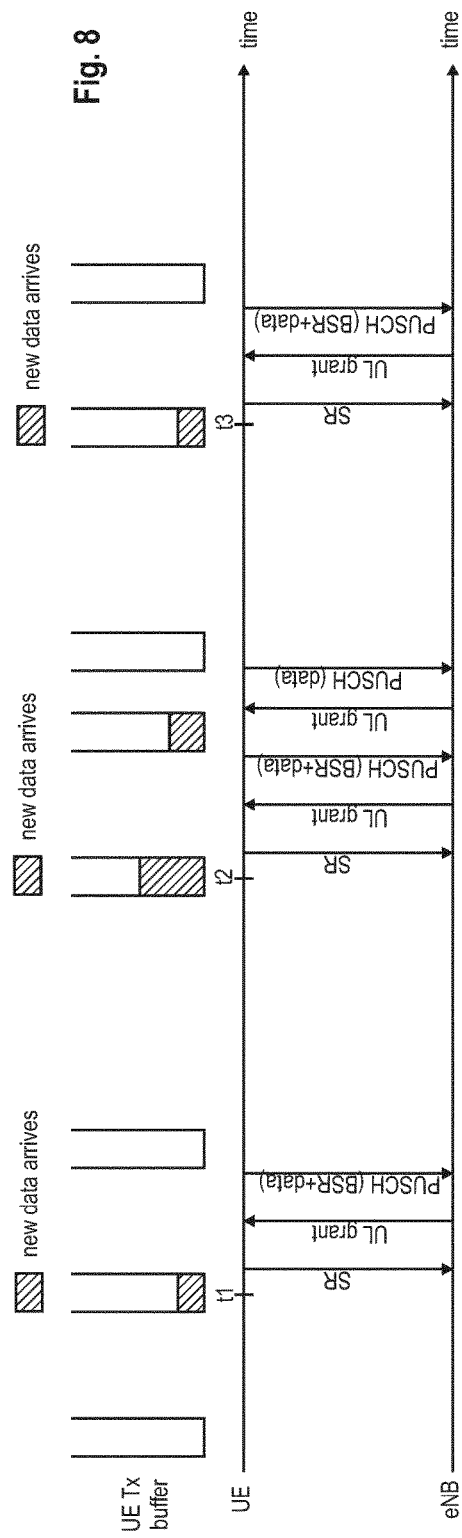
FIG. 8 illustrates in a simplified scenario the buffer status report and scheduling request triggering in the user equipment caused by arrival of new data in the transmission buffer of the user equipment, according to the prior art.
Figure 10:
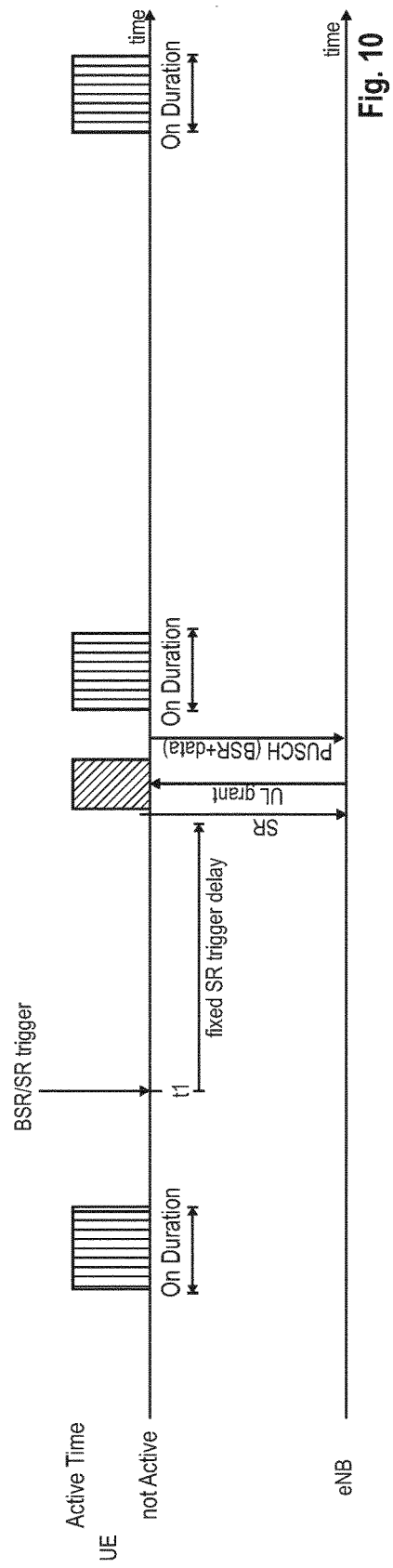
FIG. 10 illustrates the timing of the SR triggering and the subsequent transmissions of SR, UL grant and BSR, vis-a-vis the DRX functionality.

This will be illustrated and explained in more detail in connection with FIG. 10. In the upper part of FIG. 10, the DRX functionality of the UE is depicted in a simplified manner merely illustrating the periodic On-Durations of the DRX cycle; for sake of clarity, there is no distinction made between long and short DRX cycles. In a similar manner as for FIG. 8 and FIG. 9, it is assumed that at time t1 a BSR/SR is triggered due to the arrival of new data in a transmission buffer of the user equipment. Additionally, it is assumed that the transmission buffer and corresponding data are associated with a logical channel for which the scheduling request delay functionality is configured by the eNodeB. After the fixed amount of time of the delay is over, the scheduling request is triggered and is transmitted in the next scheduling request transmission occasion, and the UE transits to Active Time, allowing the UE to receive the corresponding uplink grant from the eNodeB. Since the SR triggering according to the arrival of new data can be at any time, and the SR delay is fixed, the corresponding transmission of the scheduling request and thus the transition to Active Time depends on the time t1 at which the BSR/SR is triggered. Correspondingly, as depicted in FIG. 10, the transition to Active Time in the user equipment is not synchronized with the Active Times/On-Duration periods of the DRX functionality running at the same time in the user equipment. Consequently, the UE would have to transit to Active Time even though shortly afterwards the UE would be in Active Time anyway during the periodic On-Duration. This is an unnecessary waste of power. Although illustrated for the case where a fixed delay is implemented according to the new scheduling request trigger delay function, the same applies to previously standardized versions of the scheduling request triggering where no delays are implemented.

The following exemplary embodiments are conceived by the inventors to mitigate the problems explained above and to provide an improved scheduling request procedure to reduce the power consumption in the user equipment.

In the following, several exemplary embodiments will be explained in detail. Some of these are intended to be implemented in the wide specification as given by the 3GPP standards and explained partly in the present background section, with the particular key features as explained in the following pertaining to the various embodiments. It should be noted that the embodiments may be advantageously used, for example, in a mobile communication system such as 3GPP LTE-A (Release 10/11/12) communication systems as described in the Description of the Related Art section above, but the embodiments are not limited to its use in this particular exemplary communication network.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the disclosure as such.

In the following a set of embodiments will be explained. To simplify the illustration of the underlying principles, several assumptions are made; however, it should be noted that these assumptions should not be interpreted as limiting the scope of the present application, as broadly defined by the claims. For example, a user equipment is provided with transmission buffer memory for each configured logical channel which can be used for temporarily storing uplink data until it is successfully transmitted over the radio link to the radio base station. It is further assumed that the UE has no resources available to transmit the data or a buffer status report to the radio base station, thus making it necessary to request uplink resources by use of a scheduling request. As mentioned before, scheduling requests may be either transmitted via periodic resources of the PUCCH allocated by the radio base station, or, in case no such periodic resources are available, by using a random access channel, RACH, procedure. For the purposes of explaining the exemplary embodiments, basically no distinction needs to be made between these two possibilities, since the exemplary embodiments are applicable to both. However, for illustration purposes it is assumed that such periodic PUCCH resources are available and can be used by the user equipment to transmit a dedicated scheduling request message to the radio base station. Such a dedicated scheduling request message is usually one bit long.

In addition, common to the various exemplary embodiments explained below, the triggering of the scheduling request is in response to the triggering of the buffer status report, which in turn can be triggered by the arrival of new data in a transmission buffer of a logical channel of the user equipment. For implementations according to the LTE standardization, the triggering of the buffer status report can be similar or exactly the same as defined for the current 3GPP standardization particularly in 3GPP TS 36.321 (current version 12.4.0) subclause 5.4.5, e.g., for "Regular BSR".

One of the main ideas of the exemplary embodiments is to flexibly delay the scheduling request so as to reduce power consumption in the user equipment compared to the standard triggering procedure of the prior art. In contrast to one prior art procedure where the scheduling request delay is fixed, the delay of the scheduling request according to the exemplary embodiments shall be flexible. Furthermore, the delay of the scheduling request shall be coordinated with the DRX functionality running at the user equipment, such that additional transitions to Active Time just in connection with the triggered scheduling request are avoided. Instead, those periods of Active Time where the user equipment is active for other reasons (than in connection with the triggered scheduling request) shall be exploited, such that the UE is already in Active Time and can thus monitor for the uplink grant, which is transmitted by the radio base station in response to the scheduling request.

The delay of the scheduling request can be achieved by either delaying the actual triggering of the scheduling request (which of course also delays the corresponding transmission of the scheduling request); or by delaying the transmission of the scheduling request (but not the triggering of same which can be executed immediately). These two alternatives will be explained separately in the following.

First, the delay of the triggering of the scheduling request will be explained according to one exemplary embodiment. As mentioned before, the arrival of a new data in a transmission buffer of the user equipment associated with a logical channel triggers a buffer status report, which in turn—in the absence of corresponding uplink resources to transmit the buffer status report—triggers a scheduling request. However, the triggering of the scheduling request shall be delayed in a flexible manner and shall be synchronized with the DRX functionality of the user equipment. Put differently, it can be said that, although the triggering of the scheduling request happens due to the triggered buffer status report, the triggering is actually not immediately executed, but the execution of the triggering of the scheduling request is delayed. Put still in a different manner, the triggering of the buffer status report can be seen as a first condition to trigger the scheduling request, whereas an additional second condition must be fulfilled—namely the end of the delay must be reached—so as to actually trigger the scheduling request.

The flexible delay of the triggering of the scheduling request is such that the scheduling request is triggered in one of the subframes of the periodic On-Duration period of the DRX cycle of the DRX function running at the user equipment.

Consequently, after the amount of time of the flexible delay passes, the scheduling request is actually triggered, and the corresponding transmission of the scheduling request can be performed in the next possible scheduling request transmission occasion. It should be noted that the scheduling request transmission occasions are usually configured in such a way that at least one of the scheduling request transmission occasions is during the On-Duration period of the DRX cycle.

For example, the triggering of the scheduling request may be delayed until the first subframe of an On-Duration period of the DRX cycle. Therefore, by appropriately delaying the trigger of the scheduling request to be before the scheduling request transmission occasion of the On-Duration period, the transmission of the scheduling request can be performed during said next On-Duration period in which the user equipment is already in Active Time and allows the user equipment to monitor the PDCCH for corresponding uplink grants allocated by the radio base station in response to the scheduling request. Consequently, an additional transition to Active Time just in connection with the triggered scheduling request is avoided, and power consumption can be reduced.

FIG. 11 illustrates such a flexible delay of the triggering of the scheduling request in a similar manner as FIG. 10 illustrating the fixed delay of the scheduling request suggested in the prior art. In FIG. 11, the BSR/SR trigger is depicted to take place at time t1, meaning that at said particular point in time the arrival of new data in a transmission buffer triggers the buffer status report and in turn the scheduling request. A flexible delay of the trigger of the scheduling request is implemented such that the scheduling request trigger is delayed to take place at the beginning of the On-Duration period, as depicted in FIG. 11. At the beginning of every On-Duration period, the UE transitions to Active Time. After the delay expires, the scheduling request is triggered, and the corresponding scheduling request transmission occasion during the On-Duration period is used for transmitting the triggered scheduling request. The user equipment is already in Active Time, due to being in the On-Duration period of the DRX cycle, and thus can easily monitor the PDCCH for the corresponding uplink grant from the radio base station allocating resources for the buffer status report.

The additional Active Time needed when using the fixed delay as explained in connection with FIG. 10 is no longer needed when implementing the flexible delay according to this exemplary embodiment. No extra power is wasted just to wake up for performing the BSR/SR procedure.

One implementation of this exemplary embodiment uses a timer to ensure that the trigger is delayed, e.g., a starting request trigger prohibition timer, which is started when the BSR is triggered, and where the scheduling request may not be triggered while the scheduling request trigger prohibition timer is running. This starting request prohibition timer is started with an appropriate value such that the triggering of the scheduling request is delayed until one of the subframes—e.g., the first subframe—of the On-Duration period of the DRX cycle. The starting value of that timer can be calculated by the user equipment, which knows in advance when the On-Duration periods occur (i.e., when the On-Duration timer is running); the subframes at which the UE is in the On-Duration period of its DRX cycle are deterministic and can be simply calculated based on the corresponding formula (see TS 36.321 v12.4.0 subclause 5.7). For example, the timer value with which the scheduling request trigger prohibition timer is started, is calculated to be the amount of time between the one of the subframes of the On-Duration period—e.g., the first subframe—of the DRX cycle and the subframe where the timer is started. Upon expiry of the scheduling request prohibition timer, the scheduling request can be triggered and transmitted in the next occasion.

In one example implementation in the LTE environment, the logicalChannelSR-ProhibitTimer introduced for the fixed delay (see TS 36.321 v12.4.0, subclause 5.4.5 Buffer Status Reporting) can be reused, by applying a flexible timer value (calculated by the user equipment based on the next On-Duration period and the current time) instead of a fixed timer value preconfigured by the radio base station and transmitted to the user equipment. Furthermore, the currently defined variable logicalChannelSR-ProhibitTimer-r12 of the MAC-MainConfig information element (see TS 36.331 v12.4.1, MAC-MainConfig IE) with three bits has one spare value: "spare1": ENUMERATED {sf20, sf40, sf64, sf128, sf512, sf2014, sf2560, spare1} (see TS 36.331 v12.4.1 MAC-MainConfig IE). This spare value (i.e., codepoint) can be used by the radio base station to indicate to the UE that the trigger of the scheduling request should be flexibly delayed until the next On-Duration period, while the remaining codepoints of the variable logicalChannelSR-ProhibitTimer-r12 indicate a fixed delay as currently introduced into the standardization. This solution is advantageous since no new RRC signaling, i.e., information element, needs to be introduced for that purpose; rather, the same mechanism already agreed for the fixed delay can be reused.

Figure 12:
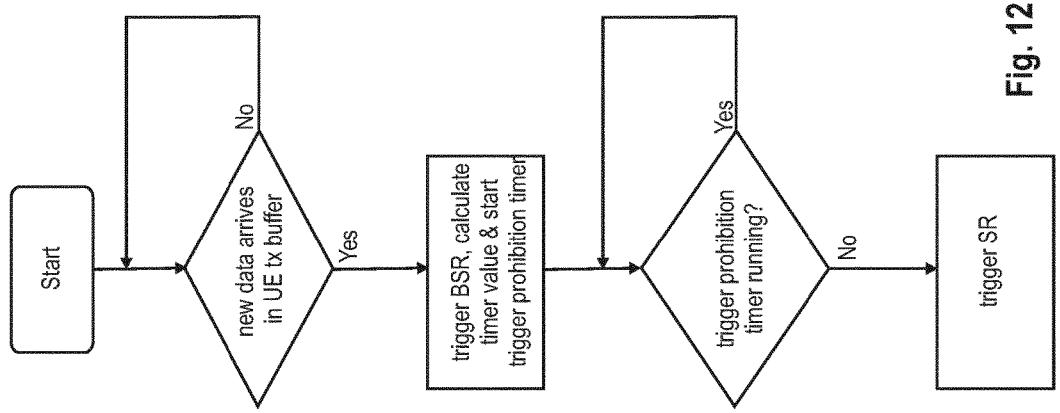
FIG. 12 is a sequence diagram for schematically illustrating the UE behavior according to some exemplary embodiments where the trigger of the scheduling request is delayed.

FIG. 12 illustrates a sequence diagram for the UE behavior when using an SR trigger prohibition timer so as to implement the flexible delay of the scheduling request as explained above. For ease of illustration, the sequence diagram of FIG. 12 ends with the triggering of the scheduling request, but of course the BSR/SR procedure continues as explained before in detail in connection with FIG. 11, i.e., by the user equipment receiving an uplink grant from the eNodeB, transmitting the BSR (and data) to the eNodeB using the allocated resources, and possibly receiving further uplink grants to transmit the remaining data if necessary.

According to a variant, the flexible delay shall be larger than a preconfigured minimum delay so as to achieve the additional benefit that the postponing of the buffer status report allows that more data arrives in the transmission buffer, and thus less scheduling requests and uplink grants are needed, as well as that uplink transmissions transport more data in less time. It is more power-efficient to transmit larger transport block sizes, rather than transmitting smaller transport block sizes. Thus, the total amount of delay that is used for the scheduling request trigger comprises a fixed minimum time and some variable time. When using a timer to implement the flexible delay, the user equipment shall take the minimum delay time into account and thus calculate the timer value to be greater than the minimum delay time; this may result in that not the directly-next On-Duration period is used for the calculation of the timer value, but a further subsequent one. In any case, the trigger of the scheduling request is delayed until an On-Duration period, be it the directly-next one after the BSR is triggered (may also be the current one) or a subsequent On-Duration period.

Similarly, in addition or instead, the flexible delay shall not be larger than a particular maximum delay so as to avoid too large a delay for the transmission of the data that triggered the BSR/SR. In said case, if no further delay of the scheduling request trigger is possible due to the maximum delay constraint, the UE might indeed need to transition to Active Time in connection with the triggered scheduling request just to be able to monitor and receive the corresponding uplink grant transmitted by the eNodeB in response to the scheduling request. While the additional advantage of the above explained embodiments, i.e., the reduced power consumption, is not possible in said particular case, when configuring such a maximum delay constraint it is ensured that the transmission of the data is not delayed too long.

The minimum delay time and/or maximum delay time can be defined, for example, by the radio base station, and can be transmitted to the UE, using appropriate signaling, e.g., RRC or MAC. In one exemplary implementation for LTE scenarios, the minimum delay time can be indicated to the UE by use of the variable logicalChannelSR-ProhibitTimer-r12 of the MAC-MainConfig information element which is already defined in LTE and allows indicating seven different delay times. In said case, since the spare codepoint of the variable logicalChannelSR-ProhibitTimer-r12 can not be used for instructing the UE to flexibly delay the triggering of the scheduling request, the UE either is preconfigured to flexibly delay the trigger of the SR, or is configured separately by the eNodeB by use of another message (e.g., RRC or MAC signaling).

Instead of using a timer for implementing the flexible delay, the eNodeB could configure specific time periods during which scheduling request triggering, or more in particular, the execution of the scheduling request triggering, is allowed. For example, the eNodeB could configure the UE such that scheduling request triggering, respectively the execution of the scheduling request triggering, is only allowed during the time period when the On-Duration timer is running.

According to some specific variants, the flexible delay of the scheduling request trigger is not applicable to all logical channels, but only to specific ones in a similar manner as already explained for the fixed scheduling request delay. In particular, some kind of data is more tolerant to delay than other, and thus the flexible delay can be logical channel specific, i.e., is configured specifically for particular logical channels, e.g., those which can tolerate some delay. This can be configured by the eNodeB, e.g., using the information element LogicalChannelConfig and the corresponding optional Boolean variable logicalChannelSR-Prohibit-r12 already introduced for the fixed delay of the scheduling request; see information element LogicalChannelConfig in 3GPP TS 36.331 v12.4.1. Of course, the eNodeB may configure the user equipment differently to flexibly delay the scheduling request triggering as explained above.

As a result, the user equipment will only flexibly delay the scheduling request in case the buffer status reports, which triggered the scheduling request, were in turn triggered upon arrival of new data in a transmission buffer associated with the specific logical channel(s). Conversely, in case new data arrives in a transmission buffer associated with a logical channel which is not configured for the flexible delay of the scheduling request, the scheduling request, triggered by the corresponding triggering of the buffer status report, will not be delayed.

In the above exemplary embodiments, the flexible delay of the scheduling request trigger is performed until one of the subframes of the On-Duration period of the DRX cycle running at the user equipment, preferably the first subframe of an On-Duration period. Alternatively, the above-explained embodiments can be changed in that the scheduling request may be flexibly delayed to any Active Time of the DRX cycle running at the user equipment, i.e., not just to the On-Duration period of the Active Time of the DRX cycle, although effectively it may be the On-Duration period as part of the Active Time of the DRX cycle. In particular, the total duration that the UE is awake is called "Active Time", and not only includes the On-Duration of the DRX cycle, but also other time periods, e.g., the time the UE monitors PDDCH while the inactivity timer is running, and the time the UE is performing, and continues reception while waiting for a downlink retransmission after one HARQ RTT (i.e., drx-RetransmissionTimer is running or the mac-Contention-ResolutionTimer is running); for the uplink the UE may be awake at those subframes where uplink retransmission grants can be received. For example, in the prior art, the UE might need to transition to Active Time for the BSR/SR procedure, which shall actually be avoided according to the exemplary embodiments. In summary, while the user equipment is at least in Active Time for the periodic On-Duration periods, it may be further in Active Time for other reasons, depending on, for example, the PDCCH activity. In this alternative exemplary embodiment, this is exploited in that the delay of the scheduling request trigger can be postponed to any of those Active Time periods of the DRX functionality.

As in the previous exemplary embodiment for delaying until a subframe of the On-Duration period, it is assumed that the scheduling request shall be triggered, e.g., by the triggering of a buffer status report upon arrival of new data in a transmission buffer of the UE. Instead of immediately triggering the scheduling request, the UE postpones the triggering of the scheduling request to an Active Time. After the UE executes the triggering of the scheduling request, the UE shall transmit the scheduling request in the next scheduling request transmission occasion.

It should be noted that in the prior art, the UE is—at the time of triggering the scheduling request—usually still in DRX sleep state, and then transitions to Active Time after triggering and transmitting the scheduling request, so as to be able to monitor in the downlink the PDCCH for the corresponding uplink grant transmitted by the eNodeB in response to the scheduling request.

Figure 7:
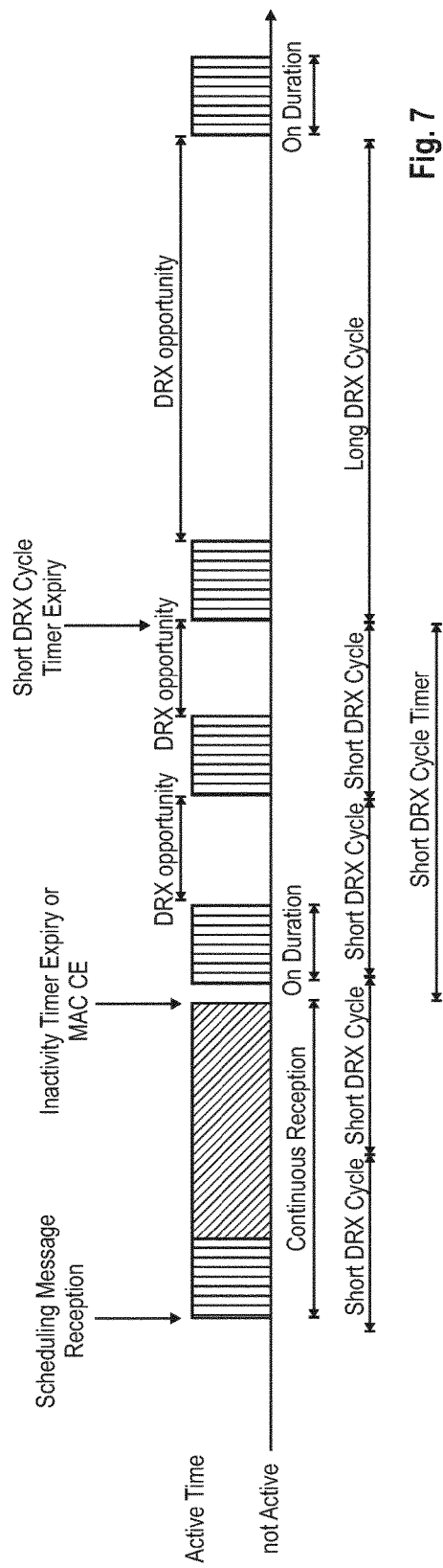
FIG. 7 illustrates the DRX operation of a mobile terminal, and in particular the DRX opportunity, On-Duration, according to the short and long DRX cycle.

While the On-Duration periods can be easily determined by the UE beforehand (i.e., they are deterministic), this is not necessarily the case for the periods where the UE is in Active Time, e.g., since this may depend on whether the UE receives a PDCCH during an Active Time subframe, e.g., On-Duration period (see UE behavior as explained in connection with FIG. 7). Consequently, in order to implement the flexible delay of the SR trigger until the UE is in Active Time, instead of using a timer as discussed before, the UE may determine, for example, subframe by subframe, whether it will be in Active Time and will then execute the triggering of the scheduling request for a subframe for which it positively determines that it is already in Active Time for another reason.

This is schematically illustrated in FIG. 13, where compared to FIG. 11 an Active Time period is present before the On-Duration period after the time instance t1. Correspondingly, instead of delaying the scheduling request trigger to the On-Duration period as in FIG. 11, in this particular embodiment the delay is only performed until the beginning of the Active Time period. The UE, after executing the scheduling request trigger after the delay, may then use the next scheduling request transmission occasion to transmit the scheduling request to the eNodeB. In view of that the UE is already in Active Time for another reason, the UE may then easily monitor the downlink control channel for the corresponding uplink grant from the eNodeB, without the need to transition to Active Time merely for the purpose of receiving said uplink grant. Therefore, one transition to Active Time can be avoided, with the corresponding advantage of a lower power consumption. Also, the delay is shorter since any Active Time of the DRX function can be used for actually executing the triggering of the SR.

Figure 14:
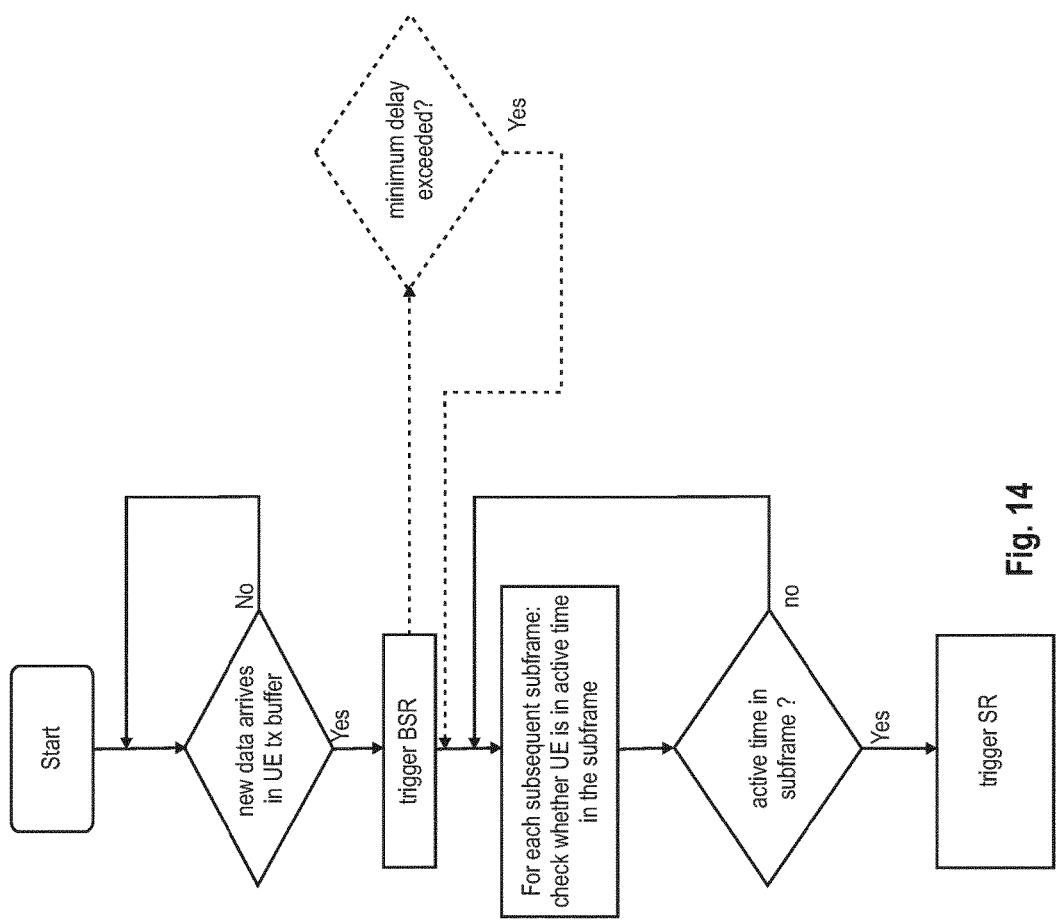
FIG. 14 is a sequence diagram for schematically illustrating the UE behavior according to some exemplary embodiments where the trigger of the scheduling request is delayed to an Active Time.

The UE behavior for this exemplary embodiment is schematically illustrated in the sequence diagram of FIG. 14. As apparent from the figure, the optional implementation of the minimum delay constraint is illustrated in dashed lines; after the BSR is triggered, the UE advantageously first checks whether the minimum delay is already exceeded before continuing with the check as to whether for the next (and if necessary for further) subframes the UE is in Active Time or not, so as to execute the SR trigger.

As with the previous exemplary embodiments regarding the flexible delay until an On-Duration period of the DRX cycle, minimum and/or maximum delay constraints may be implemented, with the corresponding advantages already explained above. Again as with the previous exemplary embodiments, the flexible delay to any Active Time of the UE shall not be applicable to all logical channels of a user equipment in view of the different Quality of Service requirements and delay tolerance of different services. Correspondingly, the flexible delay of the scheduling request trigger can be limited to only particular logical channels that may be, for example, configured by the eNodeB.

In the above, the exemplary embodiments suggested to flexibly delay the scheduling request trigger. As will be explained in the following, other exemplary embodiments allow to flexibly delay the transmission of the scheduling request, while performing the triggering of the scheduling request immediately. While the effect of the delay is rather similar to the previous exemplary embodiments where the scheduling request trigger is delayed, the implementation of same may vary. Consequently, the actual effect of the delay of the transmission of the SR can be appreciated from FIG. 11 and FIG. 13, i.e., the transmission of the SR occurs at an SR occasion during an On-Duration or other Active Time of the DRX cycle of the UE. The same advantages are achieved, namely that the extra transition to Active Time just in connection with the triggered scheduling request is avoided, and thus power can be saved.

Furthermore, in order to delay the transmission of the scheduling request, a timer may be used according to one exemplary implementation. As with the previous exemplary embodiments, while the transmission prohibition timer is running, the triggered scheduling request shall not be transmitted. To said end, an SR transmission prohibition timer is started when the SR is triggered. The timer value with which the timer is started is then calculated to be such that the scheduling request is delayed until one of the subframes—e.g., the first subframe—of the On-Duration period of the DRX cycle. As mentioned in connection with the previous exemplary embodiments, the UE knows in advance when the On-Duration periods occur, and may thus calculate the initial timer value to be the amount of time between the one of the subframes of the On-Duration period—e.g., the first subframe—of the DRX cycle and the subframe where the scheduling request transmission prohibition timer is started.

Consequently, upon expiry of the prohibition timer, the UE will use the next scheduling request transmission occasion to transmit the scheduling request. As before, it is assumed here that a scheduling request transmission occasion is always configured during the On-Duration period of the DRX cycle, allowing the UE to transmit the scheduling request while still in the On-Duration period.

As before, for implementations in the LTE environment, the logicalChannelSR-ProhibitTimer introduced for the fixed delay (see TS 36.321 v12.4.0, subclause 5.4.5 Buffer Status Reporting) can be reused. Furthermore, the variable logicalChannelSR-ProhibitTimer-r12 of the MAC-MainConfig information element currently standardized, can be reused by taking the spare codepoint to indicate to the UE that the scheduling request transmission shall be flexibly delayed until the next On-Duration period.

Figure 15:
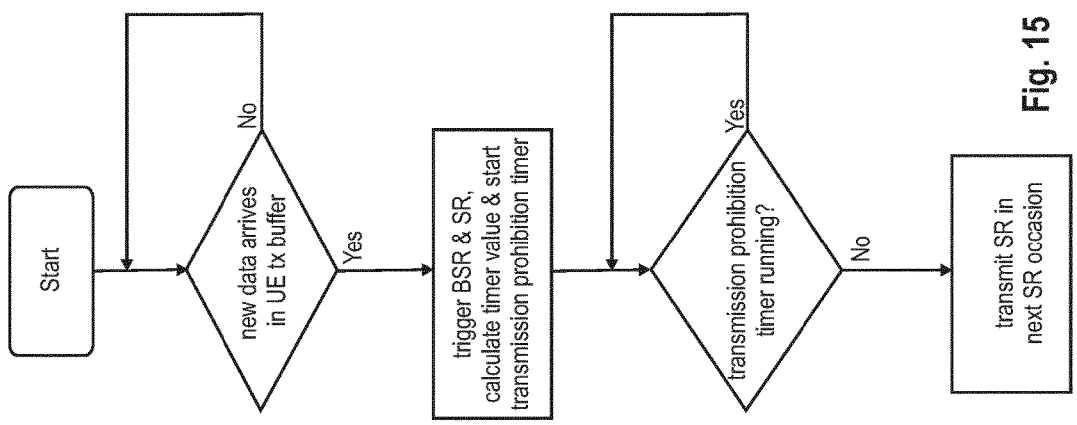

FIG. 15 schematically illustrates the corresponding UE behavior by use of a sequence diagram. As apparent therefrom and in comparison with the other sequence diagrams discussed before, the buffer status report as well as the scheduling request are actually triggered immediately upon receiving new data in the corresponding transmission buffer of the user equipment. On the other hand, the transmission of the scheduling request is then postponed by use of a corresponding transmission prohibition timer, which does not allow the scheduling request to be transmitted while it is still running.

Instead of using a timer so as to ensure the proper delay of the scheduling request transmission, the UE may be configured to only be able to use those scheduling request occasions which fall within the On-Duration period (s). In other words, a masking of the scheduling request occasions ("SR transmission masking") is performed so as to eliminate those scheduling request occasions where the UE is not in the On-Duration period of the DRX cycle. This can be simply implemented, since the UE knows in advance the scheduling request occasions and the DRX On-Duration periods, both of which are configured periodically.

A corresponding new RRC flag signaling, e.g., a new flag, can be introduced in said respect—e.g., "sr-mask" in PhysicalConfigDedicated of the radio resource control information elements—such that the eNodeB may properly instruct the UE to only use those scheduling request occasions that fall in the On-Duration period of the DRX cycle.

As discussed before in connection with the previous exemplary embodiments, a minimum and/or maximum time delay can be configured so as to achieve the additional advantages already discussed before. In particular, this may be implemented, for example, by calculating the timer start value accordingly to be larger than the minimum time delay. Alternatively, when using the scheduling request transmission masking mentioned before, only those scheduling request occasions after the minimum delay shall be considered for checking whether each is in an On-Duration period or not.

Alternatively, the above-explained embodiments can be changed in that the transmission of the scheduling request may be flexibly delayed to any Active Time of the DRX cycle running at the user equipment, i.e., not just to the On-Duration period of the Active Time of the DRX cycle although effectively it may be the On-Duration period as part of the Active Time of the DRX cycle. Thus, the UE delays the transmission of the scheduling request to a scheduling request transmission occasion which coincides with the UE already being in Active Time for a different reason (e.g., due to being in an On-Duration period of the DRX cycle).

Figure 16:
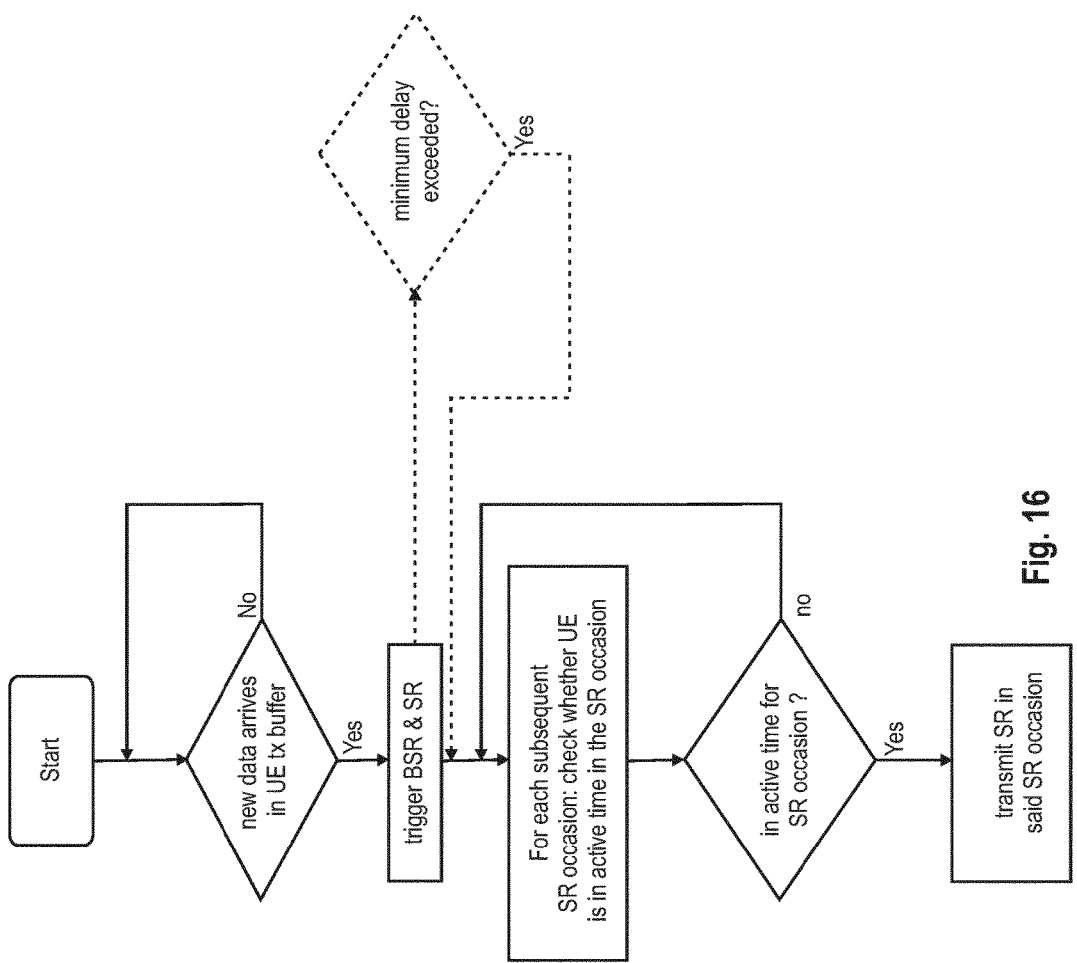
FIGS. 15, 16 are sequence diagrams for schematically illustrating the UE behavior according to some exemplary embodiments where the transmission of the scheduling request is delayed to an On-Duration period or Active Time period, respectively.

In order to implement the flexible delay of the scheduling request transmission until the UE is in Active Time, instead of using a timer as discussed before, the UE shall determine, for example, for one scheduling request transmission occasion after another, whether it will be in Active Time and will then actually perform the transmission of the scheduling request in that scheduling request transmission occasion where it positively determined to already be in Active Time for another reason. The corresponding UE behavior for this exemplary embodiment is schematically illustrated in the sequence diagram of FIG. 16. The minimum delay is again optionally illustrated in dashed lines in FIG. 16.

According to another alternative embodiment the detailed UE behavior with respect to the triggering respectively transmission of the scheduling request is depending on the DRX cycle the UE is currently using, i.e., long or short DRX cycle. For example, when using the long DRX cycle, the UE shall not delay the triggering or transmission of a scheduling request more than a configured maximum time, whereas when using the short DRX cycle, the UE shall at least delay the triggering or transmission of a scheduling request by a configured minimum time. More in particular, the eNB-configured prohibition timer value is depending on the current used DRX cycle interpreted as a minimum respectively maximum time value. This DRX-cycle-dependent timer value can be used in combination with the above-explained embodiments, e.g., delaying the trigger/transmission until On-Duration period respectively DRX Active Time.

Hardware and Software Implementation of the present disclosure

Other exemplary embodiments relate to the implementation of the above-described various embodiments using hardware and software. In this connection a user terminal (mobile terminal) and an eNodeB (base station) are provided. The user terminal and base station are adapted to perform the methods described herein, including corresponding entities to participate appropriately in the methods, such as receiver, transmitter, and processors.

It is further recognized that the various embodiments may be implemented or performed using computing devices (processors). Computing devices or processors may, for example, be general purpose processors, digital signal processors (DSP), application specific integrated circuits (ASIC), field programmable gate arrays (FPGA) or other programmable logic devices, etc. The various embodiments may also be performed or embodied by a combination of these devices.

Further, the various embodiments may also be implemented by means of software modules, which are executed by a processor or directly in hardware. Also a combination of software modules and a hardware implementation may be possible. The software modules may be stored on any kind of computer readable storage media, for example, RAM, EPROM, EEPROM, flash memory, registers, hard disks, CD-ROM, DVD, etc.

It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A method of requesting uplink resources by a user equipment in a communication system, wherein a DRX, Discontinued Reception, function is running at the user equipment, the method being performed at the user equipment and comprising:
   triggering a buffer status report;
   delaying triggering of a transmission of a scheduling request that requests uplink resources to a radio base station upon the triggering of the buffer status report,
   triggering the transmission of the scheduling request in a subframe of an OnDuration period of a DRX cycle according to the DRX function, and
   transmitting the triggered scheduling request to the radio base station,
   wherein, if a period of time to a next scheduling request transmission occasion after the triggering of the buffer status report is greater than or equal to a pre-configured minimum delay time, the triggered scheduling request is transmitted to the radio base station in the next scheduling request transmission occasion, and wherein, if the period of time to the next scheduling request transmission occasion after the triggering of the buffer status report is less than the pre-configured minimum delay time, the triggered scheduling request is transmitted to the radio base station in a subsequent scheduling request transmission occasion after the next scheduling request transmission occasion.

2. The method according to claim 1, wherein the triggering of the transmission of the scheduling request is delayed at least for the pre-configured minimum delay time and not more than a pre-configured maximum delay time, wherein the pre-configured minimum delay time is determined at the radio base station, and the user equipment receives from the radio base station an indication of the pre-configured minimum delay time.

3. The method according to claim 1, wherein the user equipment receives configuration information from the radio base station on how to delay the triggering of the scheduling request, the configuration information including one out of a plurality of codepoints where at least one of the plurality of codepoints indicates that the triggering of the transmission of the scheduling request shall be delayed such that the scheduling request is transmitted in the subframe of the OnDuration period of the DRX cycle, wherein one or more of the codepoints other than the at least one of the plurality of codepoints indicate a fixed delay time for delaying the triggering of the scheduling request.

4. The method according to claim 1, the delaying is performed using a starting request prohibition timer, wherein the triggering of the transmission of the scheduling request may not be performed while the scheduling request prohibition timer is running, the delaying including:

starting the scheduling request prohibition timer upon the triggering of the buffer status report, wherein the scheduling request prohibition timer is started with a timer value calculated by the user equipment to be an amount of time between the subframe of said OnDuration period of the DRX cycle and a subframe where the timer is started, wherein said amount of time is greater than the pre-configured minimum delay time such that the triggering of the scheduling request is delayed at least for the pre-configured minimum delay time.

5. The method according to claim 1, wherein a plurality of logical channels is configured for the user equipment, and the buffer status report is triggered upon arrival of new data in a transmission buffer associated with any of the plurality of logical channels, wherein the delaying of the triggering of the transmission of the scheduling request is only performed when the buffer status report, triggering the scheduling request, is triggered by arrival of new data associated with at least one specific logical channel out of the plurality of logical channels, wherein the specific logical channel is associated with delay-tolerant data, and wherein the radio base station determines the at least one specific logical channel out of the plurality of logical channels, and the user equipment receives from the radio base station an indication of the at least one specific logical channel.

6. A user equipment that requests uplink resources from a radio base station in a communication system, wherein a DRX, Discontinued Reception, function is running at the user equipment, the user equipment comprising:

a processor which, in operation, triggers a buffer status report, delays triggering of a transmission of a scheduling request that requests uplink resources to the radio base station upon triggering of the buffer status report, and triggers the transmission of the scheduling request in a subframe of an OnDuration period of a DRX cycle according to the DRX function, and a transmitter which, in operation, transmits the triggered scheduling request to the radio base station, wherein, if a period of time to a next scheduling request transmission occasion after the buffer status report is triggered is greater than or equal to a pre-configured minimum delay time, the triggered scheduling request is transmitted to the radio base station in the next scheduling request transmission occasion, and wherein, if the period of time to the next scheduling request transmission occasion after the buffer status report is triggered is less than the pre-configured minimum delay time, the triggered scheduling request is transmitted to the radio base station in a subsequent scheduling request transmission occasion after the next scheduling request transmission occasion.

7. The user equipment according to claim 6, wherein the processor, in operation, delays triggering of the transmission of the scheduling request at least for the pre-configured minimum delay time and not more than a pre-configured maximum delay time, wherein a receiver of the user equipment is adapted to receive from the radio base station an indication of the pre-configured minimum delay time determined at the radio base station.

8. The user equipment according to claim 6, further comprising:

a receiver which, in operation, receives configuration information from the radio base station on how to delay triggering of the transmission of the scheduling request, the configuration information including one out of a plurality of codepoints where at least one of the plurality of codepoints indicates that the triggering of the transmission of the scheduling request shall be delayed such that the transmission of the scheduling request is triggered in the subframe of the OnDuration period of the DRX cycle.

9. The user equipment according to claim 6, further comprising:

a starting request prohibition timer, wherein the processor does not trigger the transmission of the scheduling request while the scheduling request prohibition timer is running, wherein the processor, in operation, starts the scheduling request prohibition timer upon triggering of the buffer status report, calculates an amount of time between the subframe of said OnDuration period of the DRX cycle and a subframe where the timer is started, wherein the amount of time is calculated to be greater than the pre-configured minimum delay time, and uses the calculated amount of time as a timer value at which the scheduling request prohibition timer is started.

10. The user equipment according to claim 6, wherein the user equipment is configured with a plurality of logical channels, the buffer status report is triggered upon arrival of new data in a transmission buffer associated with any of the plurality of logical channels, wherein the processor delays triggering of the transmission of the scheduling requests only when the buffer status report, triggering the scheduling request, is triggered by arrival of new data associated with at least one specific logical channel out of the plurality of logical channels, and wherein a receiver of the user equipment receives an indication from the radio base station on the at least one specific logical channel.

11. A user equipment that requests uplink resources from a radio base station in a communication system, wherein a DRX, Discontinued Reception, function is running at the user equipment, the user equipment comprising:

a processor which, in operation, triggers a buffer status report, delays triggering of a transmission of a scheduling request that requests uplink resources to the radio base station upon triggering of the buffer status report, and triggers the transmission of the scheduling request when the user equipment is in active time of the DRX function, and a transmitter which, in operation, transmits the triggered scheduling request to the radio base station after the delay and when the user equipment is in active time of the DRX function, wherein, if a period of time to a next scheduling request transmission occasion after the buffer status report is triggered is greater than or equal to a pre-configured minimum delay time, the triggered scheduling request is transmitted to the radio base station in the next scheduling request transmission occasion, and wherein, if the period of time to the next scheduling request transmission occasion after the scheduling request is triggered is less than the pre-configured minimum delay time, the triggered scheduling request is transmitted to the radio base station in a subsequent scheduling request transmission occasion after the next scheduling request transmission occasion.

12. The user equipment according to claim 11, wherein the user equipment is in active time of the DRX function for a reason other than in connection with the triggered scheduling request when transmitting the triggered scheduling request.

13. The user equipment according to claim 11, wherein the processor, in operation, determines a next scheduling request transmission occasion for transmitting the triggered scheduling request that is at a time when the user equipment is in active time according to the DRX function for a reason other than in connection with the triggered scheduling request, by 1) determining whether the user equipment, at the next scheduling request transmission occasion for transmitting the triggered scheduling request, is in active time according to the DRX function for the reason other than in connection with the triggered scheduling request, 2) if the user equipment is determined to be in active time, transmitting the triggered scheduling request to the radio base station in said next scheduling request transmission occasion, 3) if the user equipment is not determined to be in active time, not becoming active and not transmitting the triggered scheduling request in said next scheduling request transmission occasion, and repeating the above 1)-3) for subsequent scheduling request transmission occasions until the triggered scheduling request is transmitted.

14. The user equipment according to claim 11, wherein the processor, in operation, determines the next scheduling request transmission occasion for transmitting the triggered scheduling request that is in a subframe of an OnDuration period of a DRX cycle according to the DRX function running at the user equipment, by 1) determining whether the next scheduling request transmission occasion for transmitting the triggered scheduling request is during an OnDuration period of the DRX cycle, 2) if the next scheduling request transmission occasion for transmitting the triggered scheduling request is determined to be during the OnDuration period of the DRX cycle, transmitting the triggered scheduling request to the radio base station in said next scheduling request transmission occasion, 3) if the next scheduling request transmission occasion for transmitting the triggered scheduling request is not determined to be during the OnDuration period of the DRX cycle, not transmitting the triggered scheduling request in said next scheduling request transmission occasion, and repeating the above 1)-3) for subsequent scheduling request transmission occasions until the triggered scheduling request is transmitted.

15. The user equipment according to claim 11, wherein the user equipment is configured with a plurality of logical channels, the buffer status report is triggered upon arrival of new data in a transmission buffer associated with any of the plurality of logical channels, wherein the processor delays triggering of the transmission of the scheduling request only when the buffer status report, triggering the scheduling request, is triggered by arrival of new data associated with at least one specific logical channel out of the plurality of logical channels, and wherein a receiver of the user equipment, in operation, receives an indication from the radio base station on the at least one specific logical channel.

* * * * *